(12) United States Patent
Kita et al.

(10) Patent No.: US 12,153,293 B2
(45) Date of Patent: Nov. 26, 2024

(54) LOW NON-LINEAR LOSS SILICON WAVEGUIDES WITH SWEEP-OUT DIODES

(71) Applicant: Ayar Labs, Inc., Santa Clara, CA (US)

(72) Inventors: Derek M. Kita, Santa Clara, CA (US); Anatol Khilo, Dublin, CA (US); Dries Vercruysse, Millbrae, CA (US); Neil Sapra, Berkeley, CA (US); John M. Fini, Albany, CA (US)

(73) Assignee: Ayar Labs, Inc., San Jose, CA (US)

( * ) Notice: Subject to any disclaimer, the term of this patent is extended or adjusted under 35 U.S.C. 154(b) by 0 days.

(21) Appl. No.: 18/453,279

(22) Filed: Aug. 21, 2023

(65) Prior Publication Data

US 2023/0393424 A1    Dec. 7, 2023

Related U.S. Application Data

(63) Continuation of application No. 17/696,823, filed on Mar. 16, 2022, now Pat. No. 11,733,554.

(60) Provisional application No. 63/161,994, filed on Mar. 17, 2021.

(51) Int. Cl.
  *G02F 1/025*    (2006.01)
  *G02B 6/02*    (2006.01)
  *G02B 6/12*    (2006.01)

(52) U.S. Cl.
  CPC .......... *G02F 1/025* (2013.01); *G02B 6/02338* (2013.01); *G02B 6/12* (2013.01); *G02B 6/12004* (2013.01); *G02B 2006/12123* (2013.01)

(58) Field of Classification Search
  CPC ....... G02F 1/025; G02B 6/02338; G02B 6/12; G02B 6/12004; G02B 2006/12061; G02B 2006/12123
  See application file for complete search history.

(56) References Cited

U.S. PATENT DOCUMENTS

| 6,801,702 | B2 * | 10/2004 | Day | G02F 1/025 |
| | | | | 385/129 |
| 7,489,439 | B2 * | 2/2009 | Kuo | H04B 10/2916 |
| | | | | 359/344 |
| 8,346,025 | B2 * | 1/2013 | Gill | G02F 1/2257 |
| | | | | 438/31 |

(Continued)

FOREIGN PATENT DOCUMENTS

GB      2394598 A    *  4/2004  .............  G02B 6/266

*Primary Examiner* — Daniel Petkovsek
(74) *Attorney, Agent, or Firm* — Penilla IP, APC

(57) ABSTRACT

An optical waveguide includes a core region extending substantially along a lengthwise centerline of the optical waveguide, a first cladding region formed along a first side of the core region, and a second cladding region formed along a second side of the core region. The optical waveguide includes a first diode segment and a second diode segment that each include respective portions of the core region, the first cladding region, and the second cladding region. The second diode segment is contiguous with the first diode segment. The first diode segment forms a first diode across the optical waveguide such that a first intrinsic electric field extends across the first diode segment in a first direction, and the second diode segment forms a second diode across the optical waveguide such that a second intrinsic electric field extends across the second diode segment in a second direction opposite the first direction.

19 Claims, 16 Drawing Sheets

(56) References Cited

U.S. PATENT DOCUMENTS

| | | | |
|---|---|---|---|
| 9,952,384 B2* | 4/2018 | Volz | G02B 6/29335 |
| 11,101,256 B2* | 8/2021 | Yu | H04B 10/524 |
| 11,733,554 B2* | 8/2023 | Kita | G02F 1/025 |
| | | | 385/14 |

* cited by examiner (View A-A)

(View A-A)

(View B-B)

(View C-C)

(View A-A)

(View B-B)

(View D-D)

(View E-E)

601

Having an optical waveguide that includes a core region, a first cladding region, and a second cladding region, where the core region extends substantially along a lengthwise centerline of the optical waveguide that corresponds to a light propagation direction through the optical waveguide, where the first cladding region is formed along a first side of the core region, and where the second cladding region is formed along a second side of the core region, where the optical waveguide includes a first diode segment and a second diode segment that each include respective portions of the core region, the first cladding region, and the second cladding region, where the second diode segment is contiguous with the first diode segment, where the first diode segment is configured to form a first diode across the optical waveguide such that a first intrinsic electric field extends across the first diode segment in a first direction substantially perpendicular to the lengthwise centerline of the optical waveguide, where the second diode segment is configured to form a second diode across the optical waveguide such that a second intrinsic electric field extends across the second diode segment in a second direction opposite the first direction, where the optical waveguide includes a first electrical conductor disposed to electrically connect the first diode segment and the second diode segment at a location on the first side of the core region, and where the optical waveguide includes a second electrical conductor disposed to electrically connect the first diode segment and the second diode segment at a location on the second side of the core region.

603

Transmitting light through the core region of the optical waveguide such that some of the light generates charge carriers within the core region, where the generated charge carriers are swept out of the core region within the first diode segment of the optical waveguide by the first intrinsic electric field, and where the generated charge carriers are swept out of the core region within the second diode segment of the optical waveguide by the second intrinsic electric field.

Fig. 6

LOW NON-LINEAR LOSS SILICON WAVEGUIDES WITH SWEEP-OUT DIODES

CLAIM OF PRIORITY

This application is a continuation application under 35 U.S.C. 120 of prior U.S. Non-Provisional patent application Ser. No. 17/696,823, filed on Mar. 16, 2022, issued as U.S. Pat. No. 11,733,554, on Aug. 22, 2023, which claims priority under 35 U.S.C. 119 to U.S. Provisional Patent Application No. 63/161,994, filed on Mar. 17, 2021. The disclosure of each above-identified patent application is incorporated herein by reference in its entirety for all purposes.

BACKGROUND

1. Field of the Invention

The disclosed embodiments relate to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient devices for conveying optical signals, modulating optical signals, and receiving optical signals. It is within this context that the disclosed embodiments arise.

SUMMARY

In an example embodiment, an optical waveguide is disclosed. The optical waveguide includes a core region extending substantially along a lengthwise centerline of the optical waveguide that corresponds to a light propagation direction through the optical waveguide. The optical waveguide also includes a first cladding region formed along a first side of the core region. The optical waveguide also includes a second cladding region formed along a second side of the core region. The optical waveguide includes a first diode segment and a second diode segment that each include respective portions of the core region, the first cladding region, and the second cladding region. The second diode segment is contiguous with the first diode segment. The first diode segment is configured to form a first diode across the optical waveguide, such that a first intrinsic electric field extends across the first diode segment in a first direction substantially perpendicular to the lengthwise centerline of the optical waveguide. The second diode segment is configured to form a second diode across the optical waveguide, such that a second intrinsic electric field extends across the second diode segment in a second direction opposite the first direction. A first electrical conductor is disposed to electrically connect the first diode segment and the second diode segment at a location on the first side of the core region. A second electrical conductor is disposed to electrically connect the first diode segment and the second diode segment at a location on the second side of the core region.

In an example embodiment, an optical waveguide is disclosed. The optical waveguide includes a core region that extends substantially along a lengthwise centerline of the optical waveguide that corresponds to a light propagation direction through the optical waveguide. The optical waveguide also includes a first cladding region formed along a first side of the core region. The optical waveguide also includes a second cladding region formed along a second side of the core region. The optical waveguide includes an N-doped region, a P-doped region, and an intrinsic region located between the N-doped region and the P-doped region. The N-doped region includes a first lengthwise section formed within the first cladding region, a second lengthwise section formed within the second cladding region, and a crosswise section formed to extend between the first lengthwise section and the second lengthwise section of the N-doped region. The P-doped region includes a first lengthwise section formed within the second cladding region, a second lengthwise section formed within the first cladding region, and a crosswise section formed to extend between the first lengthwise section and the second lengthwise section of the P-doped region. A first electrical conductor is disposed to electrically connect the first lengthwise section of the N-doped region and the second lengthwise section of the P-doped region at a location above the first cladding region. A second electrical conductor is disposed to electrically connect the first lengthwise section of the P-doped region and the second lengthwise section of the N-doped region at a location above the second cladding region. The first lengthwise section of the N-doped region, the first lengthwise section of the P-doped region, and the intrinsic region collectively form a PIN diode across the optical waveguide. The first electrical conductor and the second electrical conductor collectively close an electrical loop between the N-doped region and the P-doped region, such that an intrinsic electric field extends across the core region from the N-doped region to the P-doped region.

In an example embodiment, a method is disclosed for reducing optical loss within an optical waveguide. The method includes having an optical waveguide that includes a core region, a first cladding region, and a second cladding region. The core region extends substantially along a lengthwise centerline of the optical waveguide that corresponds to a light propagation direction through the optical waveguide. The first cladding region is formed along a first side of the core region. The second cladding region is formed along a second side of the core region. The optical waveguide includes a first diode segment and a second diode segment that each includes respective portions of the core region, the first cladding region, and the second cladding region. The second diode segment is contiguous with the first diode segment. The first diode segment is configured to form a first diode across the optical waveguide, such that a first intrinsic electric field extends across the first diode segment in a first direction substantially perpendicular to the lengthwise centerline of the optical waveguide. The second diode segment is configured to form a second diode across the optical waveguide, such that a second intrinsic electric field extends across the second diode segment in a second direction opposite the first direction. The optical waveguide also includes a first electrical conductor disposed to electrically connect the first diode segment and the second diode segment at a location on the first side of the core region. The optical waveguide also includes a second electrical conductor disposed to electrically connect the first diode segment and the second diode segment at a location on the second side of the core region. The method also includes transmitting light through the core region of the optical waveguide, such that some of the light generates free-carriers within the core region, where the generated free-carriers are swept out of the core region within the first diode segment of the optical waveguide by the first intrinsic electric field, and where the generated free-carriers are swept out of the core region within the second diode segment of the optical waveguide by the second intrinsic electric field.

In an example embodiment, a method is disclosed for manufacturing an optical conveyance device. The method includes forming an optical waveguide that includes a core region, a first cladding region, and a second cladding region. The core region extends substantially along a lengthwise centerline of the optical waveguide that corresponds to a light propagation direction through the optical waveguide. The first cladding region is formed along a first side of the core region. The second cladding region is formed along a second side of the core region. The method also includes forming a first diode within a first diode segment of the optical waveguide. The first diode segment includes a first portion of the core region, a first portion of the first cladding region, and a first portion of the second cladding region. The first diode includes an N-doped region formed within the first portion of the first cladding region and a P-doped region formed within the first portion of the second cladding region, such that a first intrinsic electric field extends through the first portion of the core region in a first direction substantially perpendicular to the lengthwise centerline of the optical waveguide. The method also includes forming a second diode within a second diode segment of the optical waveguide. The second diode segment includes a second portion of the core region, a second portion of the first cladding region, and a second portion of the second cladding region. The second diode includes a P-doped region formed within the second portion of the first cladding region and an N-doped region formed within the second portion of the second cladding region, such that a second intrinsic electric field extends through the second portion of the core region in a second direction opposite of the first direction. The method also includes electrically connecting the N-doped region of the first diode to the P-doped region of the second diode. The method also includes electrically connecting the P-doped region of the first diode to the N-doped region of the second diode.

Other aspects and advantages of the disclosed embodiments will become more apparent from the following detailed description, taken in conjunction with the accompanying drawings, illustrating by way of example the disclosed embodiments.

BRIEF DESCRIPTION OF THE DRAWINGS

FIG. 6 shows a flowchart of a method for reducing optical loss within an optical waveguide, in accordance with some embodiments.

DETAILED DESCRIPTION

Figure 1A:
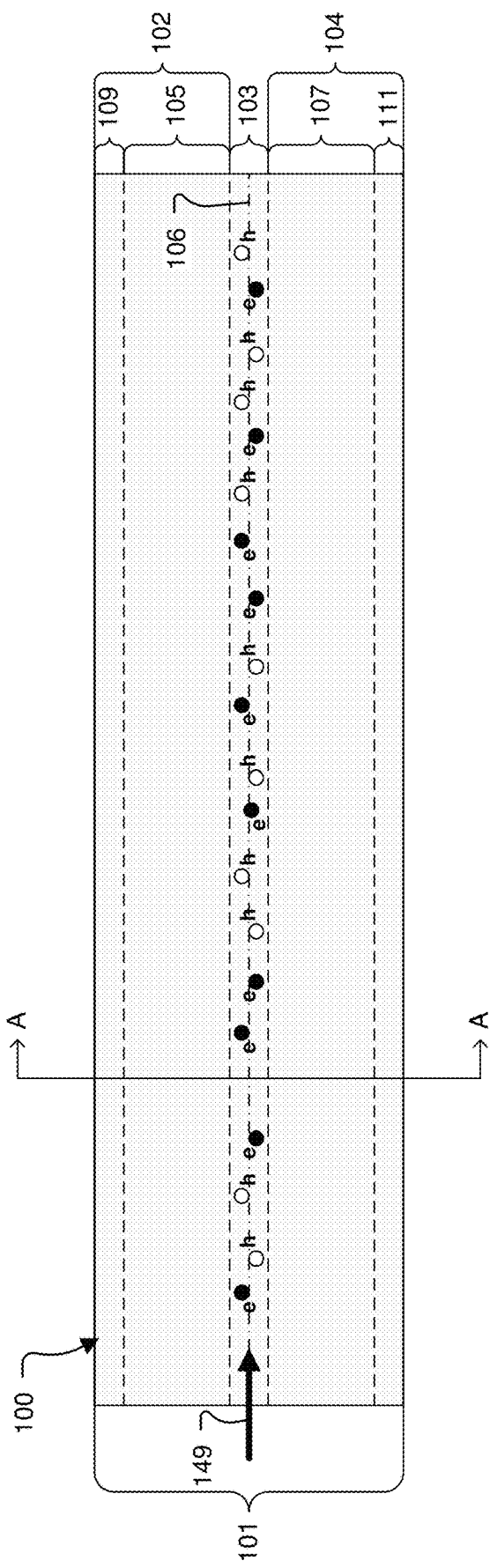
FIG. 1A shows a top view of an optical waveguide, in accordance with some embodiments.

In the following description, numerous specific details are set forth in order to provide an understanding of the disclosed embodiments. It will be apparent, however, to one skilled in the art that the disclosed embodiments may be practiced without some or all of these specific details. In other instances, well known process operations have not been described in detail in order not to unnecessarily obscure the disclosed embodiments.

Since the bandgap energy of silicon is larger than that of photons at telecom frequencies, optical (light) absorption losses of silicon optical waveguides are typically negligible. However, the energy of two photons does exceed the bandgap energy of silicon and can cause what is known as two-photon absorption (TPA) in silicon optical waveguides. The likelihood of two photons being absorbed in a silicon optical waveguide increases quadratically with the intensity of light propagating though the silicon optical waveguide. Therefore, TPA in the silicon optical waveguide is a second order optical absorption effect and is pronounced at higher optical power. While TPA introduces an additional optical loss term, increased free-carrier density generation in the silicon optical waveguide can be an even more significant contributor to linear optical loss in the silicon optical waveguide at higher optical powers. The free-carriers (electrons and holes) generated within the silicon optical waveguide produce high free-carrier optical absorption losses. The free-carrier optical absorption optical loss is linear loss created by a second-order process and is thus a third-order effect. The optical absorption loss in the optical waveguide due to TPA and free-carrier optical absorption is represented in Equation 1, where I is the light intensity, z is the light propagation distance along the optical waveguide, $\alpha'$ is the linear optical loss coefficient due to free-carriers within the optical waveguide, $\tau$ is the free-carrier lifetime within the optical waveguide, and $\beta'$ is the TPA coefficient.

$$(I/z) = -\alpha' \cdot \tau \cdot \beta' T^3 \qquad \text{Equation 1.}$$

The free-carrier lifetime $\tau$ within the optical waveguide is a key parameter, which can be reduced in various ways. For example, in some embodiments, the optical waveguide fabrication is adjusted to increase the free-carrier recombination rate in silicon and correspondingly reduce the free-carrier lifetime r within the silicon optical waveguide. In some embodiments, free-carriers are removed from the optical waveguide by an electric field. More specifically, an electric field is formed across the optical waveguide, and this electric field pulls the charged free-carriers (electrons and holes) away from a core region of the optical waveguide through which the primary optical mode propagates, so that the charged free-carriers cannot cause optical absorption loss within the core region. This process is known as carrier sweep out and can significantly reduce optical losses that scale with free-carrier concentration, such as the above-mentioned third-order optical absorption losses. In some embodiments, diodes operated in reverse bias mode are used to generate the electric field across the optical waveguide for carrier sweep out.

Figure 1B:
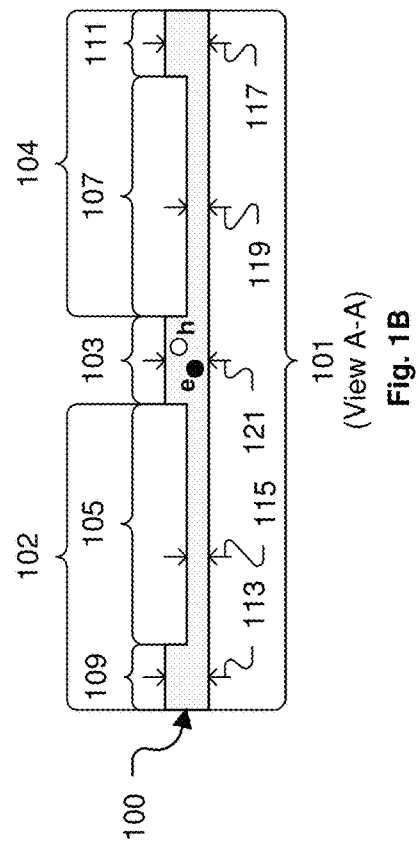
FIG. 1B shows a vertical cross-section view through the optical waveguide, referenced as View A-A in FIG. 1A, in accordance with some embodiments.

FIG. 1A shows a top view of an optical waveguide 100, in accordance with some embodiments. FIG. 1B shows a vertical cross-section view through the optical waveguide 100, referenced as View A-A in FIG. 1A, in accordance with some embodiments. In some embodiments, the optical waveguide 100 is formed of silicon. In some embodiments, the optical waveguide 100 is surrounded by one or materials that have a different optical index of refraction than that of the material used to form the optical waveguide 100. For example, in some embodiments, the optical waveguide 100 is formed of silicon and is surrounded by silicon dioxide. It should be understood that in various embodiments, the optical waveguide 100 formed of silicon can be surrounded by essentially any optical cladding material that has an optical index of refraction different than silicon.

The optical waveguide 100 includes a core region 103, a first cladding region 102, and a second cladding region 104. In some embodiments, the core region 103, the first cladding region 102, and the second cladding region 104 are formed as respective parts of a monolithic structure. The core region 103 is formed between the first cladding region 102 and the second cladding region 104, across a width 101 of the optical waveguide 100. The core region 103 extends substantially along a lengthwise centerline 106 of the optical waveguide 100. The lengthwise centerline 106 of the optical waveguide 100 corresponds to a light propagation direction 149 through the optical waveguide 100. In some embodiments, the first cladding region 102 includes a first inner cladding region 105 and a first outer cladding region 109. The first inner cladding region 105 extends between the core region 103 and the first outer cladding region 109. In some embodiments, a thickness 113 of the first outer cladding region 109 is greater than a thickness 115 of the first inner cladding region 105.

In some embodiments, the second cladding region 104 includes a second inner cladding region 107 and a second outer cladding region 111. The second inner cladding region 107 extends between the core region 103 and the second outer cladding region 111. In some embodiments, a thickness 117 of the second outer cladding region 111 is greater than a thickness 119 of the second inner cladding region 107. In some embodiments, a thickness 121 of the core region 103 is greater than the thickness 115 of the first inner cladding region 105. Also, in some embodiments, the thickness 121 of the core region 103 is greater than the thickness 119 of the second inner cladding region 107. In some embodiments, the thickness 119 of the second inner cladding region 107 is substantially equal to the thickness 115 of the first inner cladding region 105. In some embodiments, the thickness 117 of the second outer cladding region 111 is substantially equal to the thickness 113 of the first outer cladding region 109. In some embodiments, the optical waveguide 100 is referred to as a rib waveguide due to the reduced thickness 115 of the first inner cladding region 105 and the reduced thickness 119 of the second inner cladding region 107.

Light travels through the core region 103 of the optical waveguide 100 in the light propagation direction 149. At higher optical power levels, the light traveling through the core region 103 causes TPA, which generates free-carriers (electrons (e) and holes (h)) within the core region 103. The free-carriers generated in the core region 103 in turn cause free-carrier optical absorption of the light traveling through the core region 103, which results in high optical loss within the optical waveguide 100. Therefore, it is of interest to remove the free-carriers that are generated by TPA from the core region 103 in order to reduce the free-carrier optical absorption of the light traveling through the core region 103. Various embodiments are disclosed herein for modifying the optical waveguide 100 to create an intrinsic electric field across the core region 103 that serves to pull/sweep out the free-carriers from within the core region 103, so as to reduce the free-carrier optical absorption of the light traveling through the core region 103.

Figure 2A:
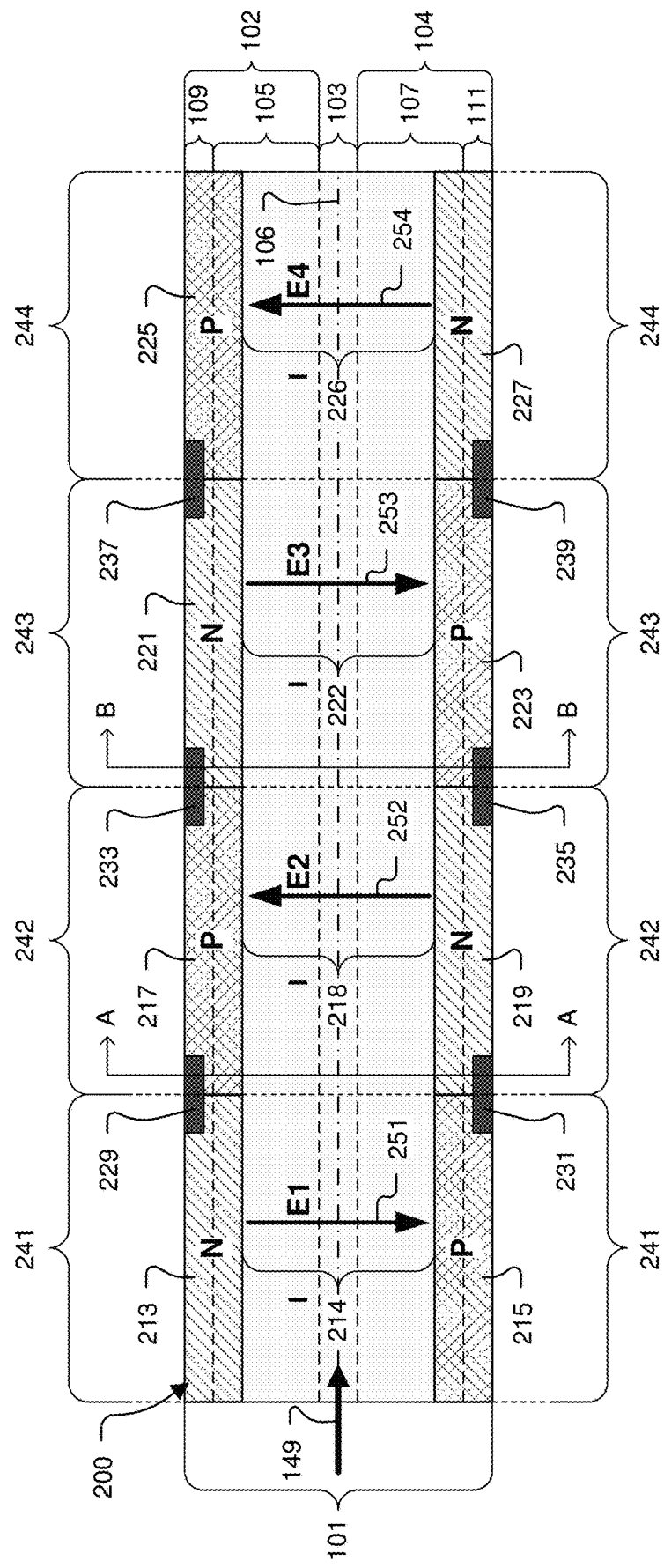
FIG. 2A shows a top view of an optical waveguide, in accordance with some embodiments.
Figure 2B:
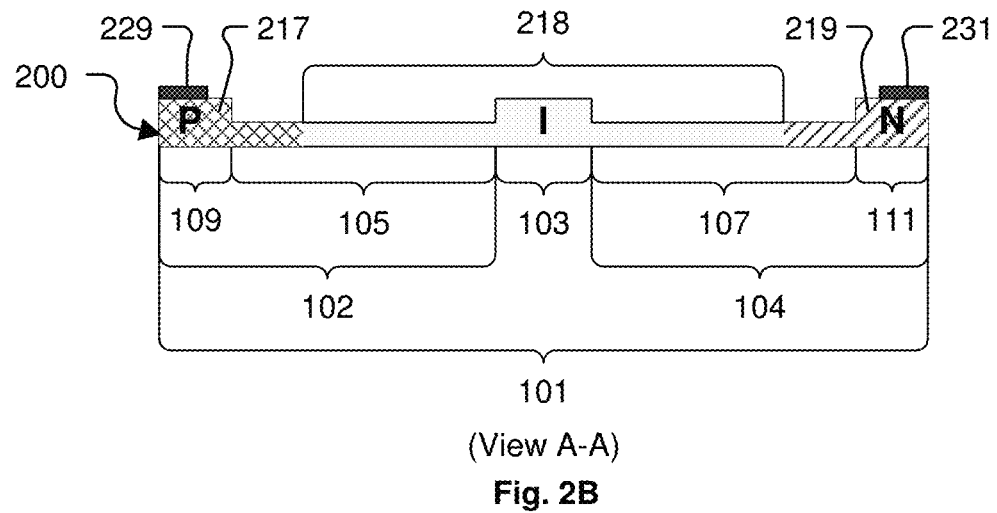
FIG. 2B shows a vertical cross-section view through the optical waveguide, referenced as View A-A in FIG. 2A, in accordance with some embodiments.
Figure 2C:
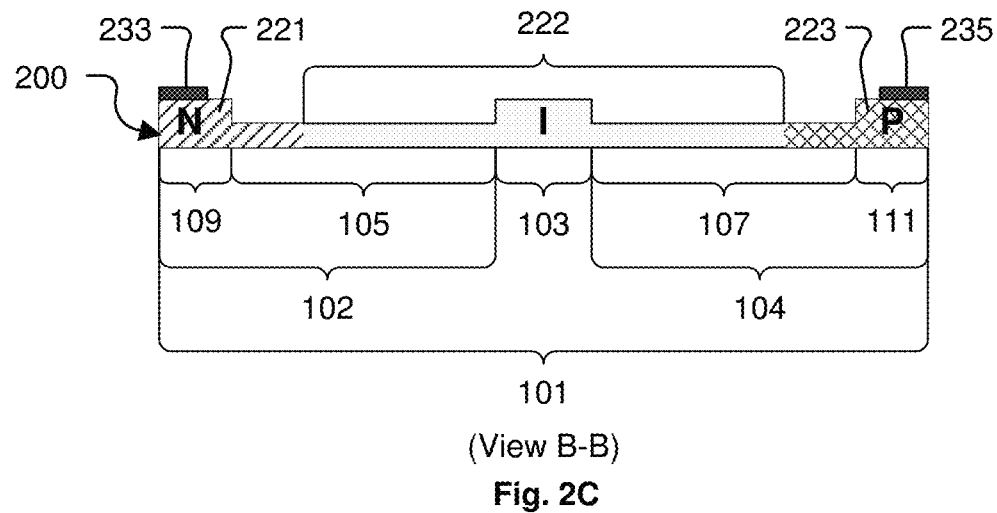
FIG. 2C shows a vertical cross-section view through the optical waveguide, referenced as View B-B in FIG. 2A, in accordance with some embodiments.

FIG. 2A shows a top view of an optical waveguide 200, in accordance with some embodiments. FIG. 2B shows a vertical cross-section view through the optical waveguide 200, referenced as View A-A in FIG. 2A, in accordance with some embodiments. FIG. 2C shows a vertical cross-section view through the optical waveguide 200, referenced as View B-B in FIG. 2A, in accordance with some embodiments. The optical waveguide 200 is a modification of the optical waveguide 100. The optical waveguide 200 includes the core region 103, the first cladding region 102, and the second cladding region 104 as described with regard to FIGS. 1A-1B. The first cladding region 102 is formed along a first side of the core region 103. The second cladding region 104 is formed along a second side of the core region 103. The optical waveguide 200 includes a first diode segment 241, a second diode segment 242, a third diode segment 243, and a fourth diode segment 244. Each of the first diode segment 241, the second diode segment 242, the third diode segment 243, and the fourth diode segment 244 includes respective portions of the core region 103, the first cladding region 102, and the second cladding region 104. In some embodiments, the second diode segment 242 is contiguous with both the first diode segment 241 and the third diode segment 243, and the fourth diode segment 244 is contiguous with the third diode segment 243. It should be understood that for ease of description FIG. 2A depicts a portion of the optical waveguide 200. The pattern of the configurations of the first diode segment 241, the second diode segment 242, the third diode segment 243, and the fourth diode segment 244 continues along the length of the optical waveguide 200. Therefore, in various embodiments, the optical waveguide 200 includes many more than just the four diode segments 241, 242, 243, and 244.

The first diode segment 241 is configured to form a first diode across the optical waveguide 200 such that a first intrinsic electric field E1 extends across the first diode segment 241 in a first direction 251 substantially perpendicular to the lengthwise centerline 106 of the optical waveguide 200. The second diode segment 242 is configured to form a second diode across the optical waveguide 200 such that a second intrinsic electric field E2 extends across the second diode segment 242 in a second direction 252 opposite the first direction 251. The third diode segment 243 is configured to form a third diode across the optical waveguide 200 such that a third intrinsic electric field E3 extends across the third diode segment 243 in a third direction 253 opposite the second direction 252. The fourth diode segment 244 is configured to form a fourth diode across the optical waveguide 200 such that a fourth intrinsic electric field E4 extends across the fourth diode segment 244 in a fourth direction 254 opposite the third direction 253.

In some embodiments, a first electrical conductor 229 is disposed to electrically connect the first diode segment 241 and the second diode segment 242 at a location over the first cladding region 102 on the first side of the core region 103. Also, in some embodiments, a second electrical conductor 231 is disposed to electrically connect the first diode segment 241 and the second diode segment 242 at a location over the second cladding region 104 on the second side of the core region 103. In some embodiments, the first electrical conductor 229 is formed as a region of silicide, and the second electrical conductor 231 is formed as another region of silicide. In some embodiments, the first electrical conductor 229 is formed as an electrically conductive structure disposed on both a region of the first diode segment 241 and a region of the second diode segment 242, and the second electrical conductor 231 is formed as an electrically conductive structure disposed on both a region of the first diode segment 241 and a region of the second diode segment 242.

In some embodiments, a third electrical conductor 233 is disposed to electrically connect the second diode segment 242 and the third diode segment 243 at a location over the first cladding region 102 on the first side of the core region 103. Also, in some embodiments, a fourth electrical conductor 235 is disposed to electrically connect the second diode segment 242 and the third diode segment 243 at a location over the second cladding region 104 on the second side of the core region 103. In some embodiments, the third electrical conductor 233 is formed as a region of silicide, and the fourth electrical conductor 235 is formed as another region of silicide. In some embodiments, the third electrical conductor 233 is formed as an electrically conductive structure disposed on both a region of the second diode segment 242 and a region of the third diode segment 243, and the fourth electrical conductor 235 is formed as an electrically conductive structure disposed on both a region of the second diode segment 242 and a region of the third diode segment 243.

In some embodiments, a fifth electrical conductor 237 is disposed to electrically connect the third diode segment 243 and the fourth diode segment 244 at a location over the first cladding region 102 on the first side of the core region 103. Also, in some embodiments, a sixth electrical conductor 239 is disposed to electrically connect the third diode segment 243 and the fourth diode segment 244 at a location over the second cladding region 104 on the second side of the core region 103. In some embodiments, the fifth electrical conductor 237 is formed as a region of silicide, and the sixth electrical conductor 239 is formed as another region of silicide. In some embodiments, the fifth electrical conductor 237 is formed as an electrically conductive structure disposed on both a region of the third diode segment 243 and a region of the fourth diode segment 244, and the sixth electrical conductor 239 is formed as an electrically conductive structure disposed on both a region of the third diode segment 243 and a region of the fourth diode segment 244.

In some embodiments, the first electrical conductor 229, the third electrical conductor 233, and the fifth electrical conductor 237 are formed as respective parts of a common electrical conductor that extends continuously across the first diode segment 241, the second diode segment 242, the third diode segment 243, and the fourth diode segment 244 at a location over the first cladding region 102 on the first side of the core region 103. In some embodiments, the second electrical conductor 231, the fourth electrical conductor 235, and the sixth electrical conductor 239 are formed as respective parts of another common electrical conductor that extends continuously across the first diode segment 241, the second diode segment 242, the third diode segment 243, and the fourth diode segment 244 at a location over the second cladding region 104 on the second side of the core region 103.

The first diode of the first diode segment 241 is configured as a first PIN diode across the optical waveguide 200. The first diode segment 241 includes an N-doped region 213 formed within an outer section of the first cladding region 102, a P-doped region 215 formed within an outer section of the second cladding region 104, and an intrinsic region 214 between the N-doped region 213 and the P-doped region 215. The built-in voltage of the first diode of the first diode segment 241 provided by the N-doped region 213 and the P-doped region 215 establishes the first intrinsic electric field E1 across the first diode segment 241, and particularly across the core region 103 within the first diode segment 241. In some embodiments, the intrinsic region 214 includes an entirety of the core region 103 within the first diode segment 241, a portion of the first cladding region 102 within the first diode segment 241, and a portion of the second cladding region 104 within the first diode segment 241. It should be understood that the core region 103 is present in the intrinsic region 214 where the first intrinsic electric field E1 is high. The width of the intrinsic region 214 is created wide enough so as to avoid overlap of the N-doped region 213 and the P-doped region 215 within the optical waveguide 200. The N-doped region 213, the P-doped region 215, and the intrinsic region 214 extend along a full length of the core region 103 within the first diode segment 241.

The second diode of the second diode segment 242 is configured as a second PIN diode across the optical waveguide 200. The second diode segment 242 includes a P-doped region 217 formed within an outer section of the first cladding region 102, an N-doped region 219 formed within an outer section of the second cladding region 104, and an intrinsic region 218 between the P-doped region 217 and the N-doped region 219. The built-in voltage of the second diode of the second diode segment 242 provided by the P-doped region 217 and the N-doped region 219 establish the second intrinsic electric field E2 across the second diode segment 242, and particularly across the core region 103 within the second diode segment 242. In some embodiments, the intrinsic region 218 includes an entirety of the core region 103 within the second diode segment 242, a portion of the first cladding region 102 within the second diode segment 242, and a portion of the second cladding region 104 within the second diode segment 242. It should be understood that the core region 103 is present in the intrinsic region 218 where the second intrinsic electric field E2 is high. The width of the intrinsic region 218 is created wide enough so as to avoid overlap of the P-doped region 217 and the N-doped region 219 within the optical waveguide 200. The P-doped region 217, the N-doped region 219, and the intrinsic region 218 extend along a full length of the core region 103 within the second diode segment 242. It should be understood that the second diode of the second diode segment 242 has a reversed orientation with respect to the first diode of the first diode segment 241, such that the second intrinsic electric field E2 has a reversed orientation with respect to the first intrinsic electric field E1, as indicated by directions 252 and 251.

The third diode of the third diode segment 243 is configured as a third PIN diode across the optical waveguide 200. The third diode segment 243 includes an N-doped region 221 formed within an outer section of the first cladding region 102, a P-doped region 223 formed within an outer section of the second cladding region 104, and an intrinsic region 222 between the N-doped region 221 and the P-doped region 223. The built-in voltage of the third diode of the third diode segment 243 provided by the N-doped region 221 and the P-doped region 223 establish the third intrinsic electric field E3 across the third diode segment 243, and particularly across the core region 103 within the third diode segment 243. In some embodiments, the intrinsic region 222 includes an entirety of the core region 103 within the third diode segment 243, a portion of the first cladding region 102 within the third diode segment 243, and a portion of the second cladding region 104 within the third diode segment 243. It should be understood that the core region 103 is present in the intrinsic region 222 where the third intrinsic electric field E3 is high. The width of the intrinsic region 222 is created wide enough so as to avoid overlap of the N-doped region 221 and the P-doped region 223 within the optical waveguide 200. The N-doped region 221, the P-doped region 223, and the intrinsic region 222 extend along a full length of the core region 103 within the third diode segment 243. It should be understood that the third diode of the third diode segment 243 has a reversed orientation with respect to the second diode of the second diode segment 242, such that the third intrinsic electric field E3 has a reversed orientation with respect to the second intrinsic electric field E2, as indicated by directions 253 and 252.

The fourth diode of the fourth diode segment 244 is configured as a fourth PIN diode across the optical waveguide 200. The fourth segment 244 includes a P-doped region 225 formed within an outer section of the first cladding region 102, an N-doped region 227 formed within an outer section of the second cladding region 104, and an intrinsic region 226 between the P-doped region 225 and the N-doped region 227. The built-in voltage of the fourth diode of the fourth diode segment 244 provided by the P-doped region 225 and the N-doped region 227 establish the fourth intrinsic electric field E4 across the fourth diode segment 244, and particularly across the core region 103 within the fourth diode segment 244. In some embodiments, the intrinsic region 226 includes an entirety of the core region 103 within the fourth diode segment 244, a portion of the first cladding region 102 within the fourth diode segment 244, and a portion of the second cladding region 104 within the fourth diode segment 244. It should be understood that the core region 103 is present in the intrinsic region 226 where the fourth intrinsic electric field E4 is high. The width of the intrinsic region 226 is created wide enough so as to avoid overlap of the P-doped region 225 and the N-doped region 227 within the optical waveguide 200. The P-doped region 225, the N-doped region 227, and the intrinsic region 226 extend along a full length of the core region 103 within the fourth diode segment 244. It should be understood that the fourth diode of the fourth diode segment 244 has a reversed orientation with respect to the third diode of the third diode segment 243, such that the fourth intrinsic electric field E4 has a reversed orientation with respect to the third intrinsic electric field E3, as indicated by directions 254 and 253.

It should be understood that the first diode segment 241 and the third diode segment 243 are configured in the same way. Also, the second diode segment 242 and the fourth diode segment 244 are configured in the same way. In this manner, the configurations of the first diode segment 241 and the second diode segment 242 repeat in a sequential manner along the length of the optical waveguide 200, including along the length of the optical waveguide 200 that is not explicitly shown in FIG. 2A. Thus, the optical waveguide 200 includes repeated instances of the first diode segment 241 and the second diode segment 242 along the length of the optical waveguide 200. It should be understood that the first diode segment 241, the second diode segment 242, the third diode segment 243, and the fourth diode segment 244 are shown in FIG. 2A for descriptive purposes, but the optical waveguide 200 is not limited to four diode segments of alternating orientation. In various embodiments, the optical waveguide 200 includes many instances of the configuration of the first diode segment 241 and the configuration of the second diode segment 242 repeated in an alternating manner along the length of the optical waveguide 200. In some embodiments, neighboring diode segments (241/242, 242/243, 243/244, etc.) of alternate orientation are contiguous with each other in the lengthwise direction of the optical waveguide 200. For example, the second diode segment 242 is contiguous with the first diode segment 241 in the lengthwise direction of the optical waveguide 200, such that the P-doped region 217 is contiguous with the N-doped region 213, and such that the N-doped region 219 is contiguous with the P-doped region 215. Also, the third diode segment 243 is contiguous with the second diode segment 242 in the lengthwise direction of the optical waveguide 200, such that the N-doped region 221 is contiguous with the P-doped region 217, and such that the P-doped region 223 is contiguous with the N-doped region 219. Also, the fourth diode segment 244 is contiguous with the third diode segment 243 in the lengthwise direction of the optical waveguide 200, such that the P-doped region 225 is contiguous with the N-doped region 221, and such that the N-doped region 227 is contiguous with the P-doped region 223.

In some embodiments, each of the first electrical conductor 229, the second electrical conductor 231, the third electrical conductor 233, the fourth electrical conductor 235, the fifth electrical conductor 237, and the sixth electrical conductor 239 is formed from material(s) used to form low-resistance electrical contacts in silicon. In some embodiments, each of the first electrical conductor 229, the second electrical conductor 231, the third electrical conductor 233, the fourth electrical conductor 235, the fifth electrical conductor 237, and the sixth electrical conductor 239 is formed substantially outside of the optical waveguide 200. In some embodiments, each of the first electrical conductor 229, the second electrical conductor 231, the third electrical conductor 233, the fourth electrical conductor 235, the fifth electrical conductor 237, and the sixth electrical conductor 239 is formed to substantially overlap each of the doped regions to which it is electrically connected. In some embodiments, the first electrical conductor 229, the third electrical conductor 233, and the fifth electrical conductor 237 are replaced by a layer of silicide that extends continuously over the N-doped region 213, the P-doped region 217, the N-doped region 221, and the P-doped region 225. Similarly, in some embodiments, the second electrical conductor 231, the fourth electrical conductor 235, and the sixth electrical conductor 239 are replaced by a layer of silicide that extends continuously over the P-doped region 215, the N-doped region 219, the P-doped region 223, and the N-doped region 227.

Figure 2D:
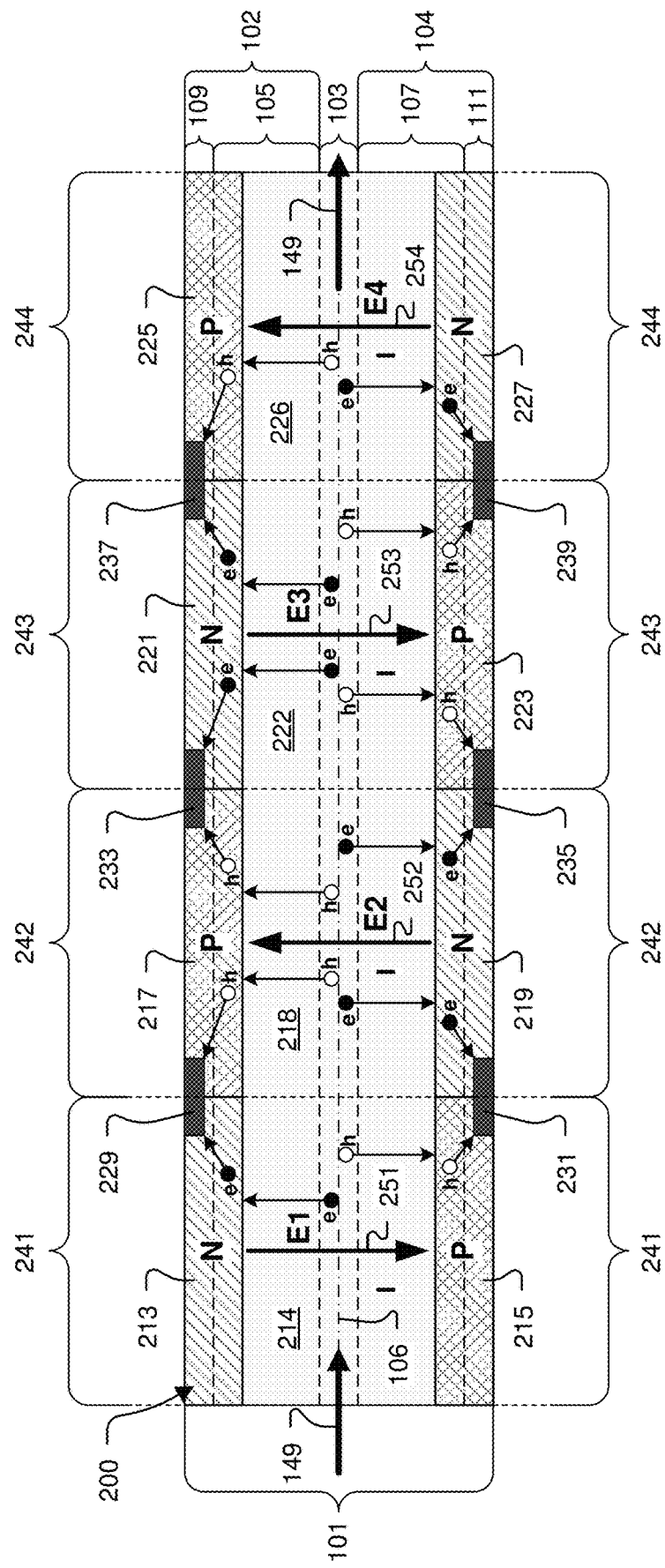
FIG. 2D shows the top view of the optical waveguide of FIG. 2A with depiction of how free-carriers (electrons (e) and holes (h)) are pulled/swept out of the core region by the diodes of the first diode segment, the second diode segment, the third diode segment, and the fourth diode segment, in accordance with some embodiments.

FIG. 2D shows the top view of the optical waveguide 200 of FIG. 2A with depiction of how free-carriers (electrons (e) and holes (h)) are pulled/swept out of the core region 103 by the diodes of the first diode segment 241, the second diode segment 242, the third diode segment 243, and the fourth diode segment 244, in accordance with some embodiments. The first intrinsic electric field E1 in the first diode segment 241 pulls the free-carrier electrons (e) out of the core region 103 to the N-doped region 213, and pulls the free-carrier holes (h) out of the core region 103 to the P-doped region 215. The second intrinsic electric field E2 in the second diode segment 242 pulls the free-carrier electrons (e) out of the core region 103 to the N-doped region 219, and pulls the free-carrier holes (h) out of the core region 103 to the P-doped region 217. The third intrinsic electric field E3 in the third diode segment 243 pulls the free-carrier electrons (e) out of the core region 103 to the N-doped region 221, and pulls the free-carrier holes (h) out of the core region 103 to the P-doped region 223. The fourth intrinsic electric field E4 in the fourth diode segment 244 pulls the free-carrier electrons (e) out of the core region 103 to the N-doped region 227, and pulls the free-carrier holes (h) out of the core region 103 to the P-doped region 225. The first electrical conductor 229 and the second electrical conductor 231 facilitate completion of an electrical circuit between the first diode segment 241 and the second diode segment 242. The second electrical conductor 233 and the third electrical conductor 235 facilitate completion of an electrical circuit between the second diode segment 242 and the third diode segment 243. The fifth electrical conductor 237 and the sixth electrical conductor 239 facilitate completion of an electrical circuit between the third diode segment 243 and the fourth diode segment 244.

The intrinsic electric fields E1-E4 across the optical waveguide 200 sweep out free-carriers that are generated within the core region 103 by TPA. By removing these free-carriers from the core region 103, the free-carrier concentration in the core region 103 stays low, which minimizes optical losses within the core region 103 due to free-carrier absorption. The orientations (perpendicular to the lengthwise centerline 106 of the optical waveguide 200) of the first, second, third, and fourth diode segments 241, 242, 243, 244, respectively, are alternated so as to close the electrical current loops created by the free-carrier sweep-out from the core region 103. It should be understood that without alternating the orientations of neighboring ones of the first, second, third, and fourth diode segments 241, 242, 243, 244, respectively, the electrical current generated by the sweep-out of TPA-generated free-carriers from the core region 103 would create an electrical charge build-up at the sides of the optical waveguide 200 that would counteract the built-in voltages of the first, second, third, and fourth diode segments 241, 242, 243, 244, respectively, and correspondingly shutdown/prevent free-carrier sweep-out from the core region 103. Therefore, by alternating the orientations of the first, second, third, and fourth diode segments 241, 242, 243, 244, respectively, along the length of the optical waveguide 200, the electrical current generated by free-carrier sweep-out in a given one of the diode segments 241, 242, 243, 244 is balanced by the electrical current generated in neighboring diode segments.

For example, in the example of FIG. 2D, the electrical current generated by free-carrier sweep-out in the first diode segment 241 is balanced by the electrical current generated by free-carrier sweep-out in the second diode segment 242. The first electrical conductor 229 and the second electrical conductor 231 facilitate balancing of electrical currents between the first diode segment 241 and the second diode segment 242. Also, the electrical current generated by free-carrier sweep-out in the second diode segment 242 is balanced by the electrical current generated by free-carrier sweep-out in the first diode segment 241 and the third diode segment 243. The third electrical conductor 233 and the fourth electrical conductor 235 facilitate balancing of electrical currents between the second diode segment 242 and the third diode segment 243. Also, the electrical current generated by free-carrier sweep-out in the third diode segment 243 is balanced by the electrical current generated by free-carrier sweep-out in the second diode segment 242 and the fourth diode segment 244. The fifth electrical conductor 237 and the sixth electrical conductor 239 facilitate balancing of electrical currents between the third diode segment 243 and the fourth diode segment 244. Also, the electrical current generated by free-carrier sweep-out in the fourth diode segment 244 is balanced by the electrical current generated by free-carrier sweep-out in the third diode segment 243.

Figure 2E:
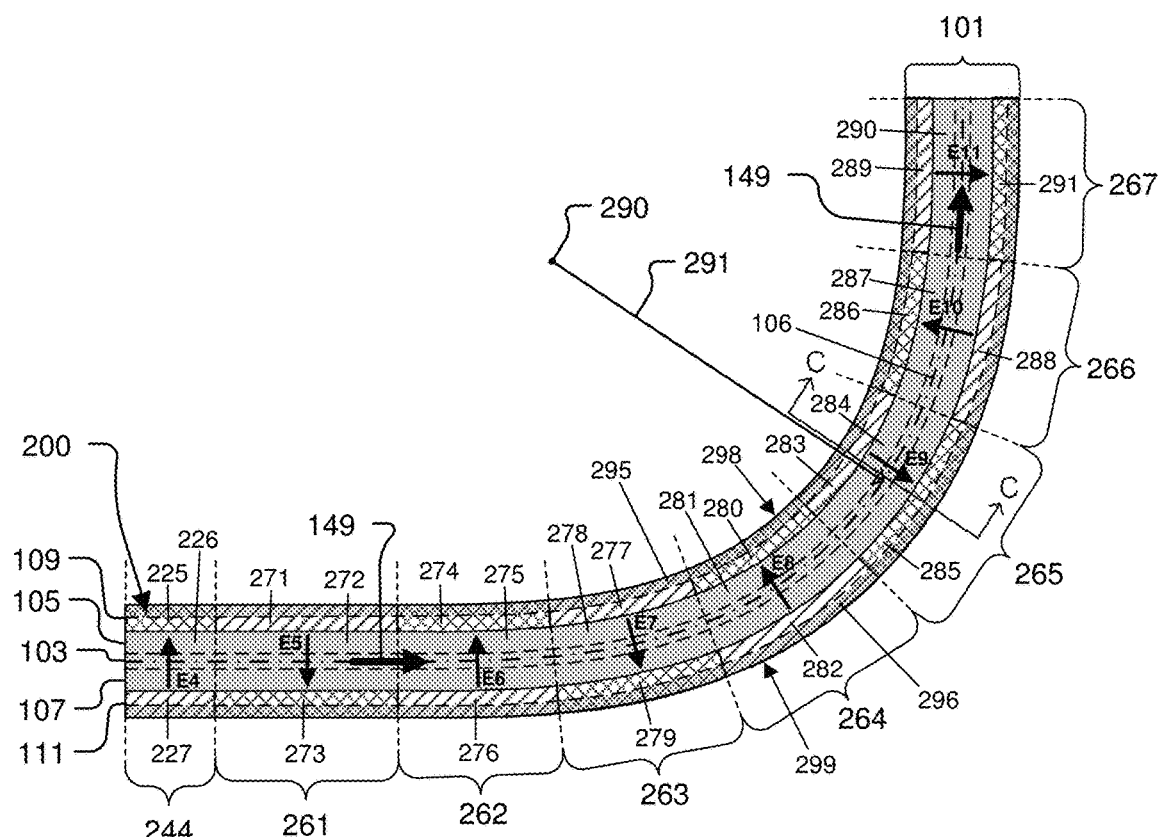
FIG. 2E shows a curved portion of the optical waveguide, in accordance with some embodiments.
Figure 2F:
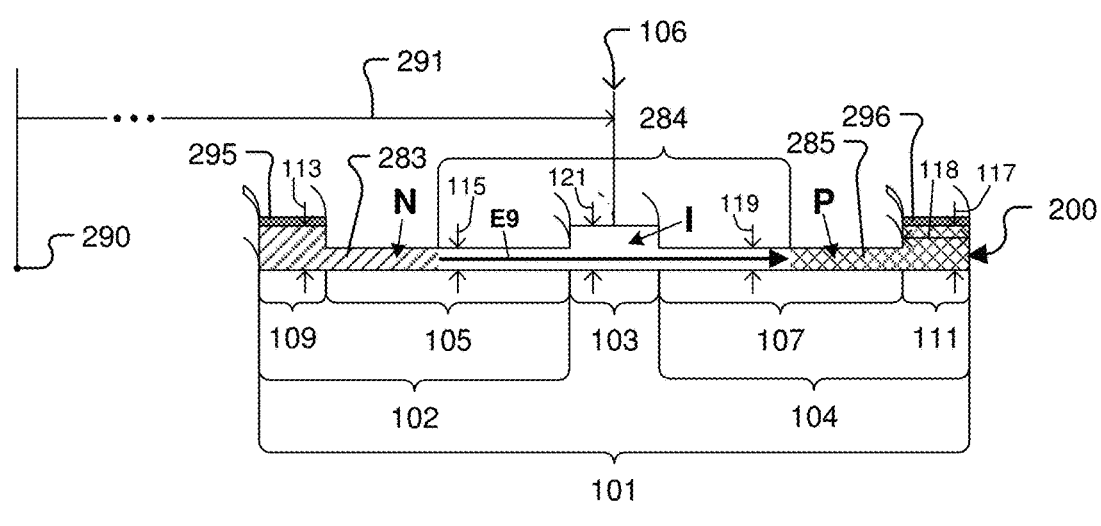
FIG. 2F shows a vertical cross-section view through the optical waveguide, referenced as View C-C in FIG. 2E, in accordance with some embodiments.

FIG. 2E shows a curved portion of the optical waveguide 200, in accordance with some embodiments. FIG. 2F shows a vertical cross-section view through the optical waveguide 200, referenced as View C-C in FIG. 2E, in accordance with some embodiments. In some embodiments, the curved portion of the optical waveguide 200 has the full-thickness 121 core region 103, the partial-thickness 115 first inner cladding region 105, the partial-thickness 119 second inner cladding region 107, the full-thickness 113 first outer cladding region 109, and the full-thickness 117 second outer cladding region 111. Alternatively, in some embodiments of the curved portion of the optical waveguide 200, the thickness 113 of the first outer cladding region 109 is substantially equal to the partial-thickness 115 of the first inner cladding region 105. Also, in some embodiments of the curved portion of the optical waveguide 200, the thickness 117 of the second outer cladding region 111 is substantially equal to the partial-thickness 119 of the second inner cladding region 107.

The example of FIG. 2E shows diode segments 261-267. The orientations of the diode segments 261-267 across the optical waveguide 200 are alternated along the curved portion of the optical waveguide 200. In some embodiments, the lengthwise centerline 106 of the optical waveguide 200 has a radius of curvature 291 about a point 290. In this manner, an inner side 298 of the curved portion of the optical waveguide 200 has a smaller radius of curvature about the point 290 than a corresponding outer side 299 of the curved portion of the optical waveguide 200 at a given position along the lengthwise centerline 106 of the optical waveguide 200.

In some embodiments, a continuous electrical conductor 295 is formed on the first outer cladding region 109 along the inner side 298 of the curved portion of the optical waveguide 200. Also, in some embodiments, a continuous electrical conductor 296 is formed on the second outer cladding region 111 along the outer side 299 of the curved portion of the optical waveguide 200. In some embodiments, the continuous electrical conductors 295 and 296 are formed as respective silicide regions. In some embodiments, the continuous electrical conductors 295 and 296 are formed as respective electrically conductive structures disposed in electrical contact with the optical waveguide 200. In some embodiments, rather than having the continuous electrical conductors 295 and 296, the curved portion of the optical waveguide 200 is formed to have discrete electrical conductors respectively disposed to connect neighboring N-doped and P-doped regions of the optical waveguide 200, such as previously described with regard to the electrical conductors 229, 231, 233, 235, 237, and 239.

The diode segment 261 includes an N-doped region 271, a P-doped region 273, and an intrinsic region 272 extending between the N-doped region 271 and the P-doped region 273. The diode segment 261 has an intrinsic (built-in) electrical field E5 that extends across the core region 103 from the N-doped region 271 to the P-doped region 273. The diode segment 261 is contiguous with the diode segment 244, such that the N-doped region 271 is contiguous with the P-doped region 225, and such that the P-doped region 273 is contiguous with the N-doped region 227, and such that the intrinsic region 272 is contiguous with the intrinsic region 226.

The next diode segment 262 includes a P-doped region 274, an N-doped region 276, and an intrinsic region 275 extending between the P-doped region 274 and the N-doped region 276. The diode segment 262 has an intrinsic (built-in) electrical field E6 that extends across the core region 103 from the N-doped region 276 to the P-doped region 274. The diode segment 262 is contiguous with the diode segment 261, such that the P-doped region 274 is contiguous with the N-doped region 271, and such that the N-doped region 276 is contiguous with the P-doped region 273, and such that the intrinsic region 275 is contiguous with the intrinsic region 272.

The next diode segment 263 includes an N-doped region 277, a P-doped region 279, and an intrinsic region 278 extending between the N-doped region 277 and the P-doped region 279. The diode segment 263 has an intrinsic (built-in) electrical field E7 that extends across the core region 103 from the N-doped region 277 to the P-doped region 279. The diode segment 263 is contiguous with the diode segment 262, such that the N-doped region 277 is contiguous with the P-doped region 274, and such that the P-doped region 279 is contiguous with the N-doped region 276, and such that the intrinsic region 278 is contiguous with the intrinsic region 275.

The next diode segment 264 includes a P-doped region 280, an N-doped region 282, and an intrinsic region 281 extending between the P-doped region 280 and the N-doped region 282. The diode segment 264 has an intrinsic (built-in) electrical field E8 that extends across the core region 103 from the N-doped region 282 to the P-doped region 280. The diode segment 264 is contiguous with the diode segment 263, such that the P-doped region 280 is contiguous with the N-doped region 277, and such that the N-doped region 282 is contiguous with the P-doped region 279, and such that the intrinsic region 281 is contiguous with the intrinsic region 278.

The next diode segment 265 includes an N-doped region 283, a P-doped region 285, and an intrinsic region 284 extending between the N-doped region 283 and the P-doped region 285. The diode segment 265 has an intrinsic (built-in) electrical field E9 that extends across the core region 103 from the N-doped region 283 to the P-doped region 285. The diode segment 265 is contiguous with the diode segment 264, such that the N-doped region 283 is contiguous with the P-doped region 280, and such that the P-doped region 285 is contiguous with the N-doped region 282, and such that the intrinsic region 284 is contiguous with the intrinsic region 281.

The next diode segment 266 includes a P-doped region 286, an N-doped region 288, and an intrinsic region 287 extending between the P-doped region 286 and the N-doped region 288. The diode segment 266 has an intrinsic (built-in) electrical field E10 that extends across the core region 103 from the N-doped region 288 to the P-doped region 286. The diode segment 266 is contiguous with the diode segment 265, such that the P-doped region 286 is contiguous with the N-doped region 283, and such that the N-doped region 288 is contiguous with the P-doped region 285, and such that the intrinsic region 287 is contiguous with the intrinsic region 284.

The next diode segment 267 includes an N-doped region 289, a P-doped region 291, and an intrinsic region 290 extending between the N-doped region 289 and the P-doped region 291. The diode segment 267 has an intrinsic (built-in) electrical field E11 that extends across the core region 103 from the N-doped region 289 to the P-doped region 291. The diode segment 267 is contiguous with the diode segment 266, such that the N-doped region 289 is contiguous with the P-doped region 286, and such that the P-doped region 291 is contiguous with the N-doped region 288, and such that the intrinsic region 290 is contiguous with the intrinsic region 287.

Figure 2G:
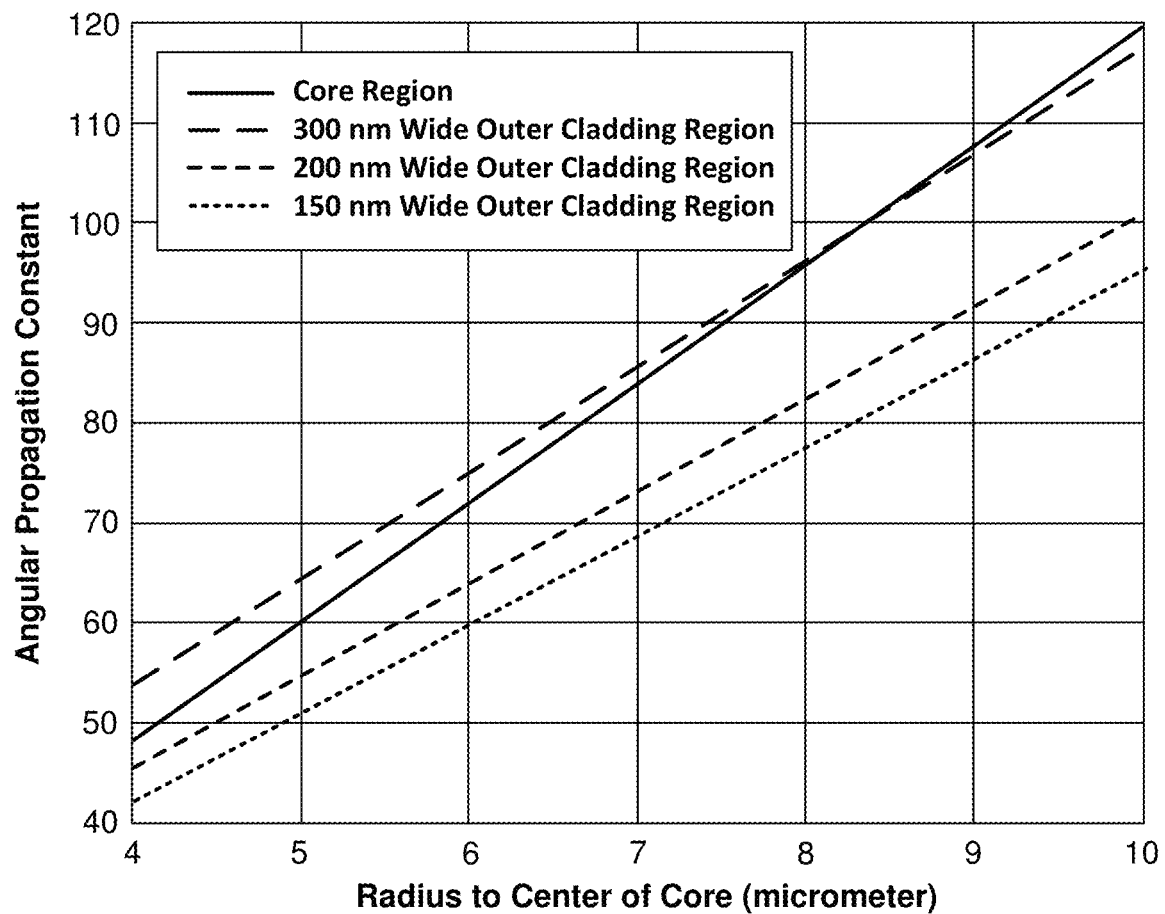
FIG. 2G shows plots of optical angular propagation constant as a function the radius of curvature of the lengthwise centerline of the optical waveguide for the primary optical mode within the core region and the primary optical mode in the second outer cladding region for various widths of the second outer cladding region, in accordance with some embodiments.

FIG. 2G shows plots of optical angular propagation constant as a function the radius of curvature 291 of the lengthwise centerline 106 of the optical waveguide 200 about the point 290 for the primary optical mode within the core region 103 and the primary optical mode in the second outer cladding region 111 for various widths (300 nanometers (nm), 200 nm, 150 nm) of the second outer cladding region 111, in accordance with some embodiments. The width 118 of the second outer cladding region 111 is depicted in FIG. 2F. FIG. 2G shows that the optical angular propagation constant of the primary optical mode within the second outer cladding region 111 decreases as the width 118 of the second outer cladding region 111 decreases, and vice-versa. The 300 nm wide outer cladding region curve in FIG. 2G shows that the optical angular propagation constant of the primary optical mode within the second outer cladding region 111 substantially matches the optical angular propagation constant of the primary optical mode within the core region 103 at a particular combination of radius of curvature 291 of the optical waveguide 200 and width 118 of the second outer cladding region 111. In some embodiments, the width 118 of the second outer cladding region 111 is set small enough to avoid optical phase-matching resonances between light guided in the primary optical mode of the core region 103 and optical modes of the second outer cladding region 111. The optical phase-matching resonance condition takes into account the radius of curvature 291 of the lengthwise centerline 106 of the optical waveguide 200, which effectively increases the effective optical index of refraction of the optical modes of the second outer cladding region 111. In some embodiments, the optical phase-matching resonance condition is determined in terms of optical angular propagation constant. In some embodiments in which the curved portion of the optical waveguide 200 has both the first outer cladding region 109 on the inside of the curve and the second outer cladding region 111 on the outside of the curve, the effective optical index of refraction corrections will be opposite for the first outer cladding region 109 and the second outer cladding region 111.

The alternating orientations of the diode segments (241-244 and 261-267, etc.) along the length of the optical waveguide 200 avoids the need for having additional electrical interconnection structures around the optical waveguide 200. In the optical waveguide 200, the electrical field used to sweep out free-carriers from the core region 103 is the intrinsic (built-in) electrical field of the diode junctions within each of the diode segments (241-244 and 261-267, etc.). In some embodiments, because the electrical current generated by TPA within the core region 103 results in a voltage drop across the optical waveguide 200, which would tend to counter the free-carrier sweep-out effect, the respective lengths of the diode segments (241-244 and 261-267, etc.) along the optical waveguide 200 are made smaller to enhance the electrical current balancing between neighboring ones of the diode segments (241-244 and 261-267, etc.) having opposite orientations across the optical waveguide 200. Also, in some embodiments, some of the different diode segments (241-244 and 261-267, etc.) along the optical waveguide 200 have different lengths, as measured along the lengthwise centerline 106 of the optical waveguide 200. In some embodiments, the different lengths of the different diode segments (241-244 and 261-267, etc.) along the optical waveguide 200 are defined to compensate for an electrical current density imbalance between the different diode segments (241-244 and 261-267, etc.).

In some embodiments, optical decay along the optical waveguide 200 will affect the TPA electrical current generation and create an electrical current imbalance which will result in a small voltage drop across the optical waveguide 200 between the first cladding region 102 and the second cladding region 104. In some embodiments, the lengths of the different diode segments (241-244 and 261-267, etc.) along the optical waveguide 200 are defined to compensate for the electrical current density differences (imbalances) along the optical waveguide 200 caused by the optical decay effect on TPA electrical current generation. Therefore, in some embodiments, the lengths of the different diode segments (241-244 and 261-267, etc.) along the optical waveguide 200 are defined to improve electrical current balance along the length of the optical waveguide 200, which provides for reduction in voltage build-up between the first cladding region 102 and the second cladding region 104 along the length of the optical waveguide 200.

It should be understood that, in some embodiments, the optical waveguide 200 provides a silicon optical waveguide structure having reduced TPA-driven optical power loss at high optical power. As described with regard to FIGS. 2A-2F, in some embodiments, the optical waveguide 200 is a rib-shaped optical waveguide structure that is doped on each side to create multiple diode structures of alternating orientation along the length of the optical waveguide 200. Also, it should be understood that, in some embodiments, the optical waveguide 200 is constructed with minimal to no additional electrical interconnection structures near or on the optical waveguide 200, which is beneficial at least because such additional electrical interconnection structures could potentially optically interfere with light traveling through the optical waveguide 200. In particular, in some embodiments, the optical waveguide 200 does not require routing of metal traces over the core region 103 in order to short the diode terminals of the diode segments (241-244 and 261-267, etc.) along the length of the optical waveguide 200. In some embodiments, each of the diode segments (241-244 and 261-267, etc.) of the optical waveguide 200 is not connected to any electrical circuit external to the optical waveguide 200.

Figure 3:
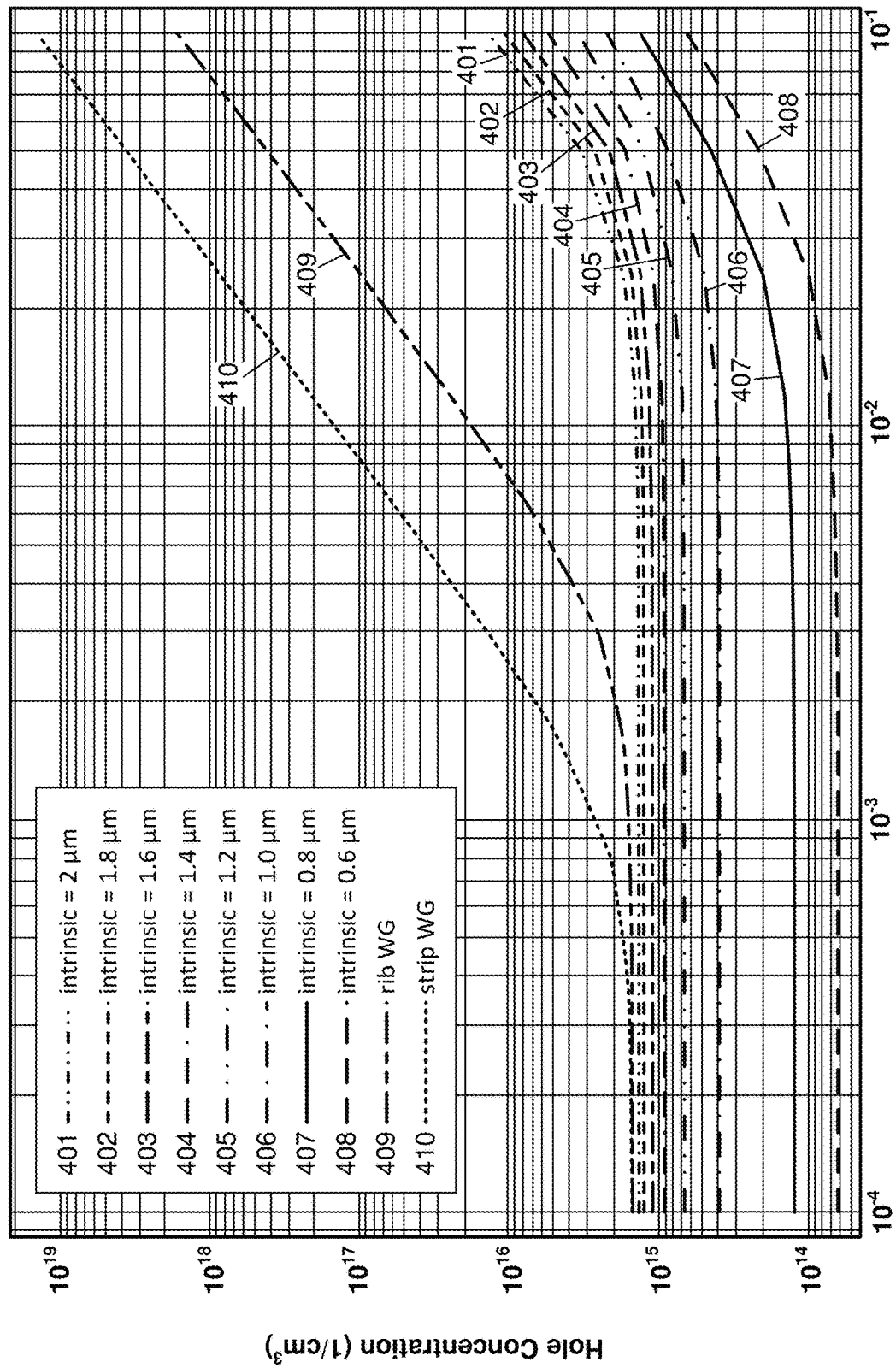
FIG. 3 shows simulation results of free-carrier build-up in the core region at different optical powers for various embodiments of the optical waveguide of FIGS. 2A-2F in which the width of the intrinsic regions is modified, in accordance with some embodiments.

FIG. 3 shows simulation results of free-carrier build-up in the core region 103 at different optical powers for various embodiments of the optical waveguide 200 in which the width of the intrinsic regions 214, 218, 222, 226 is modified, in accordance with some embodiments. More specifically, FIG. 3 shows the average hole concentration in the core region 103 as a function of the optical power of the light transmitted through the optical waveguide 200. A curve 401 shows the average hole concentration in the core region 103 as a function of optical power for the optical waveguide 200 in which the width (as measured perpendicular to the lengthwise centerline 106) of each of the intrinsic regions 214, 218, 222, 226 is 2 micrometers. A curve 402 shows the average hole concentration in the core region 103 as a function of optical power for the optical waveguide 200 in which the width (as measured perpendicular to the lengthwise centerline 106) of each of the intrinsic regions 214, 218, 222, 226 is 1.8 micrometers. A curve 403 shows the average hole concentration in the core region 103 as a function of optical power for the optical waveguide 200 in which the width (as measured perpendicular to the lengthwise centerline 106) of each of the intrinsic regions 214, 218, 222, 226 is 1.6 micrometers. A curve 404 shows the average hole concentration in the core region 103 as a function of optical power for the optical waveguide 200 in which the width (as measured perpendicular to the lengthwise centerline 106) of each of the intrinsic regions 214, 218, 222, 226 is 1.4 micrometers. A curve 405 shows the average hole concentration in the core region 103 as a function of optical power for the optical waveguide 200 in which the width (as measured perpendicular to the lengthwise centerline 106) of each of the intrinsic regions 214, 218, 222, 226 is 1.2 micrometers. A curve 406 shows the average hole concentration in the core region 103 as a function of optical power for the optical waveguide 200 in which the width (as measured perpendicular to the lengthwise centerline 106) of each of the intrinsic regions 214, 218, 222, 226 is 1.0 micrometers. A curve 407 shows the average hole concentration in the core region 103 as a function of optical power for the optical waveguide 200 in which the width (as measured perpendicular to the lengthwise centerline 106) of each of the intrinsic regions 214, 218, 222, 226 is 0.8 micrometers. A curve 408 shows the average hole concentration in the core region 103 as a function of optical power for the optical waveguide 200 in which the width (as measured perpendicular to the lengthwise centerline 106) of each of the intrinsic regions 214, 218, 222, 226 is 0.6 micrometers. Curves 401 through 408 show that as the width of the intrinsic regions 214, 218, 222, 226 is reduced in the optical waveguide 200, the concentration of free-carriers within the core region 103 is correspondingly reduced.

FIG. 3 also shows a curve 409 for the average hole concentration in the core region 103 as a function of optical power for the undoped optical waveguide 100 of FIG. 1A that does not include the diode segments 241, 242, 243, 244, etc., such as present within the optical waveguide 200. FIG. 3 also shows a curve 410 for the average hole concentration as a function of optical power within an undoped strip optical waveguide in which the strip optical waveguide has a substantially uniform vertical thickness along its length. The strip optical waveguide associated with curve 410 is like the optical waveguide 100 of FIG. 1A, except with substantially equal sizes for each of the thickness 113 of the first outer cladding region 109, the thickness 115 of the first inner cladding region 105, the thickness 121 of the core region 103, the thickness 119 of the second inner cladding region 107, and the thickness 117 of the second outer cladding region 111. FIG. 3 shows that the optical waveguide 200 has about a three order of magnitude reduction in free-carrier concentration in the core region 103 at about 30 milliWatts as compared with the strip optical waveguide.

Figure 4A:
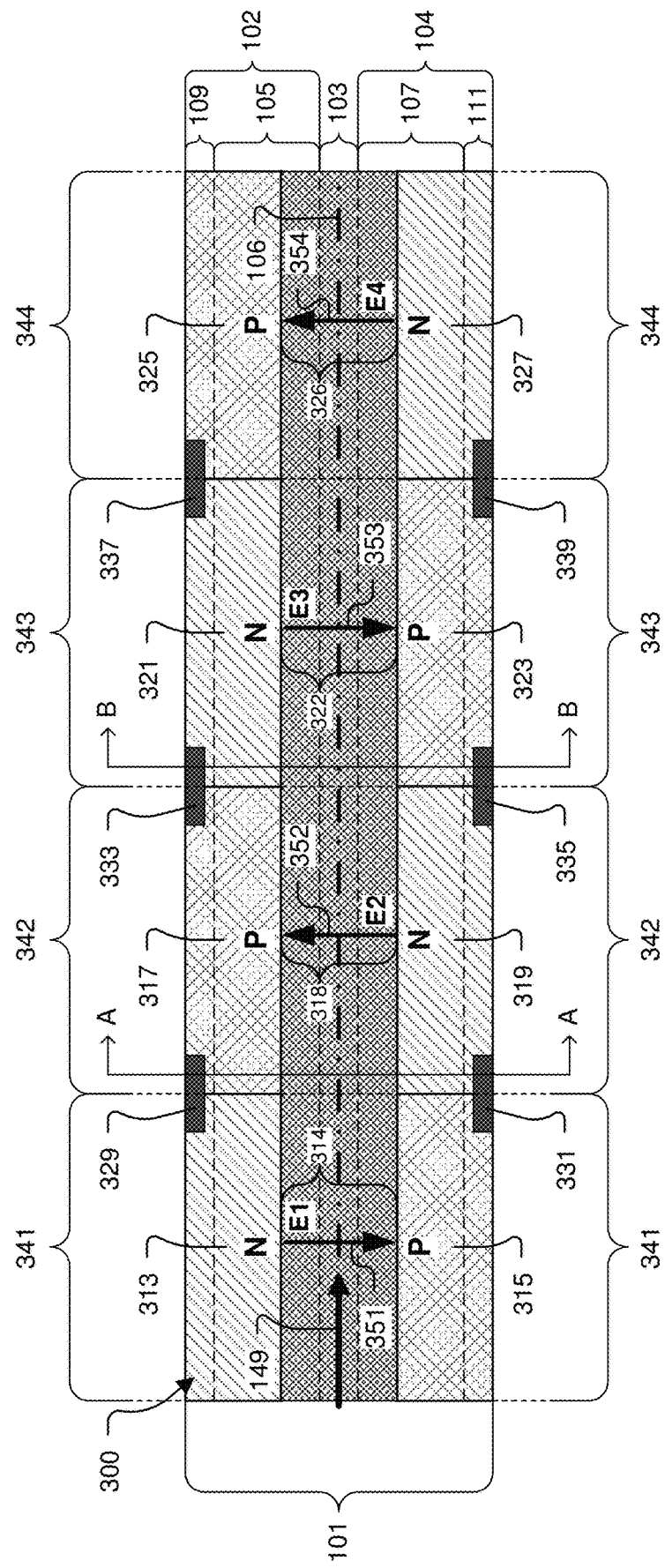
FIG. 4A shows a top view of an optical waveguide, in accordance with some embodiments.
Figure 4B:
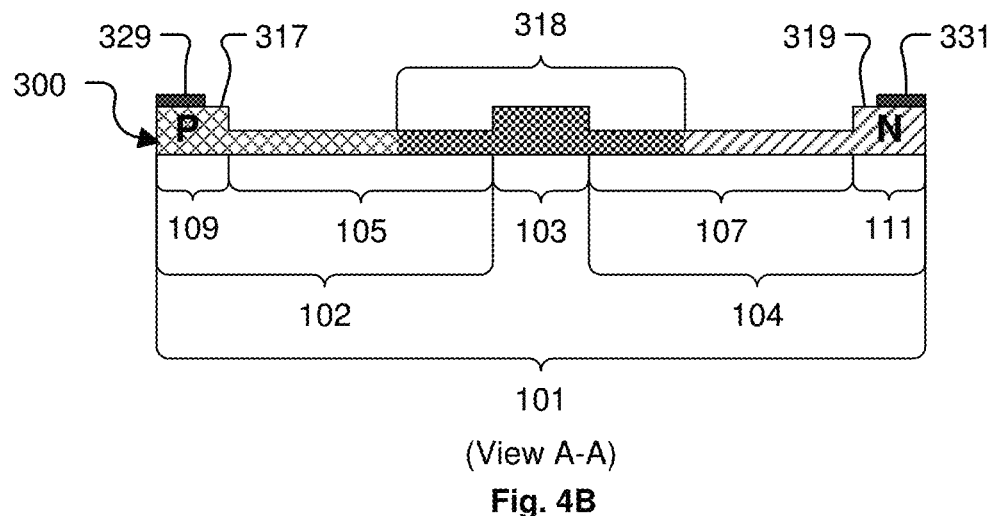
FIG. 4B shows a vertical cross-section view through the optical waveguide, referenced as View A-A in FIG. 4A, in accordance with some embodiments.
Figure 4C:
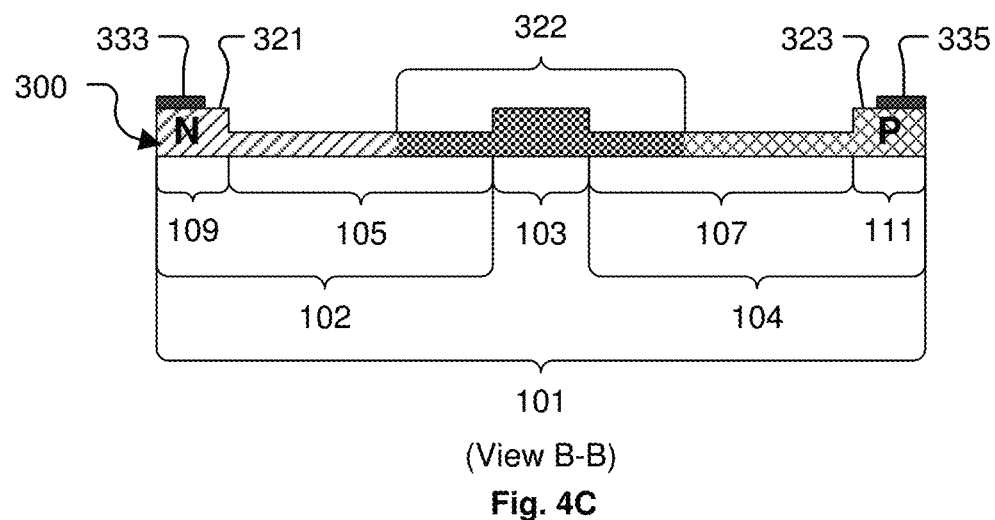
FIG. 4C shows a vertical cross-section view through the optical waveguide, referenced as View B-B in FIG. 4A, in accordance with some embodiments.

FIG. 4A shows a top view of an optical waveguide 300, in accordance with some embodiments. FIG. 4B shows a vertical cross-section view through the optical waveguide 300, referenced as View A-A in FIG. 4A, in accordance with some embodiments. FIG. 4C shows a vertical cross-section view through the optical waveguide 300, referenced as View B-B in FIG. 4A, in accordance with some embodiments. The optical waveguide 400 is a modification of the optical waveguide 100 of FIGS. 1A-1B. The optical waveguide 300 includes the core region 103, the first cladding region 102, and the second cladding region 104 as described with regard to FIGS. 1A-1B. The optical waveguide 300 includes a first diode segment 341, a second diode segment 342, a third diode segment 343, and a fourth diode segment 344. Each of the first diode segment 341, the second diode segment 342, the third diode segment 343, and the fourth diode segment 344 includes respective portions of the core region 103, the first cladding region 102, and the second cladding region 104. In some embodiments, the second diode segment 342 is contiguous with both the first diode segment 341 and the third diode segment 343, and the fourth diode segment 344 is contiguous with the third diode segment 343. It should be understood that for ease of description FIG. 4A depicts a portion of the optical waveguide 300. The pattern of the configurations of the first diode segment 341, the second diode segment 342, the third diode segment 343, and the fourth diode segment 344 continues along the length of the optical waveguide 300. Therefore, in various embodiments, the optical waveguide 300 includes many more than just the four diode segments 341, 342, 343, and 344.

The first diode segment 341 is configured to form a first PN diode across the optical waveguide 300 such that a first intrinsic electric field E1 extends across the first diode segment 341 in a first direction 351 substantially perpendicular to the lengthwise centerline 106 of the optical waveguide 300. The first diode segment 341 includes a first N-doped region 313 formed across the first half of the optical waveguide 300 and a first P-doped region 315 formed across the second half of the optical waveguide 300. The first N-doped region 313 extends across the first cladding region 102 outward from the lengthwise centerline 106 of the optical waveguide 300. The first P-doped region 315 extends across the second cladding region 104 outward from the lengthwise centerline 106 of the optical waveguide 300. A first depletion region 314 exists within the first diode segment 341 along an interface between the first N-doped region 313 and the first P-doped region 315. The first N-doped region 313, the first P-doped region 315, and the associated first depletion region 314 extend along a full length of the core region 103 within the first diode segment 341.

The built-in voltage of the first PN diode of the first diode segment 341 provided by the first N-doped region 313 and the first P-doped region 315 establishes the first intrinsic electric field E1 across the first diode segment 341, and particularly across the core region 103 within the first diode segment 341. In some embodiments, the first depletion region 314 includes an entirety of the core region 103 within the first diode segment 341, a portion of the first cladding region 102 within the first diode segment 341, and a portion of the second cladding region 104 within the first diode segment 341. It should be understood that the core region 103 is present in the first depletion region 314 where the first intrinsic electric field E1 is high. In some embodiments, the respective doping levels of the first N-doped region 313 and the first P-doped region 315 are sufficiently low to provide the first depletion region 314 with a sufficiently large width to encompass the core region 103 within the first diode segment 341, and correspondingly reduce optical losses caused by overlap of the core region 103 with the first N-doped region 313 and the first P-doped region 315.

The second diode segment 342 is configured to form a second PN diode across the optical waveguide 300 such that a second intrinsic electric field E2 extends across the second diode segment 342 in a second direction 352 substantially perpendicular to the lengthwise centerline 106 of the optical waveguide 300. The second diode segment 342 includes a second P-doped region 317 formed across the first half of the optical waveguide 300 and a second N-doped region 319 formed across the second half of the optical waveguide 300. The second P-doped region 317 extends across the first cladding region 102 outward from the lengthwise centerline 106 of the optical waveguide 300. The second N-doped region 319 extends across the second cladding region 104 outward from the lengthwise centerline 106 of the optical waveguide 300. A second depletion region 318 exists within the second diode segment 342 along an interface between the second P-doped region 317 and the second N-doped region 319. The second P-doped region 317, the second N-doped region 319, and the associated second depletion region 318 extend along a full length of the core region 103 within the second diode segment 342.

The built-in voltage of the second PN diode of the second diode segment 342 provided by the second P-doped region 317 and the second N-doped region 319 establishes the second intrinsic electric field E2 across the second diode segment 342, and particularly across the core region 103 within the second diode segment 342. In some embodiments, the second depletion region 318 includes an entirety of the core region 103 within the second diode segment 342, a portion of the first cladding region 102 within the second diode segment 342, and a portion of the second cladding region 104 within the second diode segment 342. It should be understood that the core region 103 is present in the second depletion region 318 where the second intrinsic electric field E2 is high. In some embodiments, the respective doping levels of the second P-doped region 317 and the second N-doped region 319 are sufficiently low to provide the second depletion region 318 with a sufficiently large width to encompass the core region 103 within the second diode segment 342, and correspondingly reduce optical losses caused by overlap of the core region 103 with the second P-doped region 317 and the second N-doped region 319. It should be understood that the second PN diode of the second diode segment 342 has a reversed orientation with respect to the first PN diode of the first diode segment 341, such that the second intrinsic electric field E2 has a reversed orientation with respect to the first intrinsic electric field E1, as indicated by directions 352 and 351.

The third diode segment 343 is configured to form a third PN diode across the optical waveguide 300 such that a third intrinsic electric field E3 extends across the third diode segment 343 in a third direction 353 substantially perpendicular to the lengthwise centerline 106 of the optical waveguide 300. The third diode segment 343 includes a third N-doped region 321 formed across the first half of the optical waveguide 300 and a third P-doped region 323 formed across the second half of the optical waveguide 300. The third N-doped region 321 extends across the first cladding region 102 outward from the lengthwise centerline 106 of the optical waveguide 300. The third P-doped region 323 extends across the second cladding region 104 outward from the lengthwise centerline 106 of the optical waveguide 300. A third depletion region 322 exists within the third diode segment 343 along an interface between the third N-doped region 321 and the third P-doped region 323. The third N-doped region 321, the third P-doped region 323, and the associated third depletion region 322 extend along a full length of the core region 103 within the third diode segment 343.

The built-in voltage of the third PN diode of the third diode segment 343 provided by the third N-doped region 321 and the third P-doped region 323 establishes the third intrinsic electric field E3 across the third diode segment 343, and particularly across the core region 103 within the third diode segment 343. In some embodiments, the third depletion region 322 includes an entirety of the core region 103 within the third diode segment 343, a portion of the first cladding region 102 within the third diode segment 343, and a portion of the second cladding region 104 within the third diode segment 343. It should be understood that the core region 103 is present in the third depletion region 322 where the third intrinsic electric field E3 is high. In some embodiments, the respective doping levels of the third N-doped region 321 and the third P-doped region 323 are sufficiently low to provide the third depletion region 322 with a sufficiently large width to encompass the core region 103 within the third diode segment 343, and correspondingly reduce optical losses caused by overlap of the core region 103 with the third N-doped region 321 and the third P-doped region 323. It should be understood that the third PN diode of the third diode segment 343 has a reversed orientation with respect to the second PN diode of the second diode segment 342, such that the third intrinsic electric field E3 has a reversed orientation with respect to the second intrinsic electric field E2, as indicated by directions 353 and 352.

The fourth diode segment 344 is configured to form a fourth PN diode across the optical waveguide 300 such that a fourth intrinsic electric field E4 extends across the fourth diode segment 344 in a fourth direction 354 substantially perpendicular to the lengthwise centerline 106 of the optical waveguide 300. The fourth diode segment 344 includes a fourth P-doped region 325 formed across the first half of the optical waveguide 300 and a fourth N-doped region 327 formed across the second half of the optical waveguide 300. The fourth P-doped region 325 extends across the first cladding region 102 outward from the lengthwise centerline 106 of the optical waveguide 300. The fourth N-doped region 327 extends across the second cladding region 104 outward from the lengthwise centerline 106 of the optical waveguide 300. A fourth depletion region 326 exists within the fourth diode segment 344 along an interface between the fourth P-doped region 325 and the fourth N-doped region 327. The fourth P-doped region 325, the fourth N-doped region 327, and the associated fourth depletion region 326 extend along a full length of the core region 103 within the fourth diode segment 344.

The built-in voltage of the fourth PN diode of the fourth diode segment 344 provided by the fourth P-doped region 325 and the fourth N-doped region 327 establishes the fourth intrinsic electric field E4 across the fourth diode segment 344, and particularly across the core region 103 within the fourth diode segment 344. In some embodiments, the fourth depletion region 326 includes an entirety of the core region 103 within the fourth diode segment 344, a portion of the first cladding region 102 within the fourth diode segment 344, and a portion of the second cladding region 104 within the fourth diode segment 344. It should be understood that the core region 103 is present in the fourth depletion region 326 where the fourth intrinsic electric field E4 is high. In some embodiments, the respective doping levels of the fourth P-doped region 325 and the fourth N-doped region 327 are sufficiently low to provide the fourth depletion region 326 with a sufficiently large width to encompass the core region 103 within the fourth diode segment 344, and correspondingly reduce optical losses caused by overlap of the core region 103 with the fourth P-doped region 325 and the fourth N-doped region 327. It should be understood that the fourth PN diode of the fourth diode segment 344 has a reversed orientation with respect to the third PN diode of the third diode segment 343, such that the fourth intrinsic electric field E4 has a reversed orientation with respect to the third intrinsic electric field E3, as indicated by directions 354 and 353.

In some embodiments, a first electrical conductor 329 is disposed to electrically connect the first diode segment 341 and the second diode segment 342 at a location over the first cladding region 102 on the first side of the core region 103. Also, in some embodiments, a second electrical conductor 331 is disposed to electrically connect the first diode segment 341 and the second diode segment 342 at a location over the second cladding region 104 on the second side of the core region 103. In some embodiments, the first electrical conductor 329 is formed as a region of silicide, and the second electrical conductor 331 is formed as another region of silicide. In some embodiments, the first electrical conductor 329 is formed as an electrically conductive structure disposed on both a region of the first diode segment 341 and a region of the second diode segment 342, and the second electrical conductor 331 is formed as an electrically conductive structure disposed on both a region of the first diode segment 341 and a region of the second diode segment 342.

In some embodiments, a third electrical conductor 333 is disposed to electrically connect the second diode segment 342 and the third diode segment 343 at a location over the first cladding region 102 on the first side of the core region 103. Also, in some embodiments, a fourth electrical conductor 335 is disposed to electrically connect the second diode segment 342 and the third diode segment 343 at a location over the second cladding region 104 on the second side of the core region 103. In some embodiments, the third electrical conductor 333 is formed as a region of silicide, and the fourth electrical conductor 335 is formed as another region of silicide. In some embodiments, the third electrical conductor 333 is formed as an electrically conductive structure disposed on both a region of the second diode segment 342 and a region of the third diode segment 343, and the fourth electrical conductor 335 is formed as an electrically conductive structure disposed on both a region of the second diode segment 342 and a region of the third diode segment 343.

In some embodiments, a fifth electrical conductor 337 is disposed to electrically connect the third diode segment 343 and the fourth diode segment 344 at a location over the first cladding region 102 on the first side of the core region 103. Also, in some embodiments, a sixth electrical conductor 339 is disposed to electrically connect the third diode segment 343 and the fourth diode segment 344 at a location over the second cladding region 104 on the second side of the core region 103. In some embodiments, the fifth electrical conductor 337 is formed as a region of silicide, and the sixth electrical conductor 339 is formed as another region of silicide. In some embodiments, the fifth electrical conductor 337 is formed as an electrically conductive structure disposed on both a region of the third diode segment 343 and a region of the fourth diode segment 344, and the sixth electrical conductor 339 is formed as an electrically conductive structure disposed on both a region of the third diode segment 343 and a region of the fourth diode segment 344.

In some embodiments, the first electrical conductor 329, the third electrical conductor 333, and the fifth electrical conductor 337 are formed as respective parts of a common electrical conductor that extends continuously across the first diode segment 341, the second diode segment 342, the third diode segment 343, and the fourth diode segment 344 at a location over the first cladding region 102 on the first side of the core region 103. In some embodiments, the second electrical conductor 331, the fourth electrical conductor 335, and the sixth electrical conductor 339 are formed as respective parts of another common electrical conductor that extends continuously across the first diode segment 341, the second diode segment 342, the third diode segment 343, and the fourth diode segment 344 at a location over the second cladding region 104 on the second side of the core region 103.

It should be understood that the first diode segment 341 and the third diode segment 343 are configured in the same way. Also, the second diode segment 342 and the fourth diode segment 344 are configured in the same way. In this manner, the configurations of the first diode segment 341 and the second diode segment 342 repeat in a sequential manner along the length of the optical waveguide 300, including along the length of the optical waveguide 300 that is not explicitly shown in FIG. 4A. Thus, the optical waveguide 300 includes repeated instances of the first diode segment 341 and the second diode segment 342 along the length of the optical waveguide 300. It should be understood that the first diode segment 341, the second diode segment 342, the third diode segment 343, and the fourth diode segment 344 are shown in FIG. 4A for descriptive purposes, but the optical waveguide 300 is not limited to four diode segments of alternating orientation. In various embodiments, the optical waveguide 300 includes many instances of the configuration of the first diode segment 341 and the configuration of the second diode segment 342 repeated in an alternating manner along the length of the optical waveguide 300. In some embodiments, neighboring diode segments (341/342, 342/343, 343/344, etc.) of alternate orientation are contiguous with each other in the lengthwise direction of the optical waveguide 300. For example, the second diode segment 342 is contiguous with the first diode segment 341 in the lengthwise direction of the optical waveguide 300, such that the P-doped region 317 is contiguous with the N-doped region 313, and such that the N-doped region 319 is contiguous with the P-doped region 315. Also, the third diode segment 343 is contiguous with the second diode segment 342 in the lengthwise direction of the optical waveguide 300, such that the N-doped region 321 is contiguous with the P-doped region 317, and such that the P-doped region 323 is contiguous with the N-doped region 319. Also, the fourth diode segment 344 is contiguous with the third diode segment 343 in the lengthwise direction of the optical waveguide 300, such that the P-doped region 325 is contiguous with the N-doped region 321, and such that the N-doped region 327 is contiguous with the P-doped region 323.

In some embodiments, each of the first electrical conductor 329, the second electrical conductor 331, the third electrical conductor 333, the fourth electrical conductor 335, the fifth electrical conductor 337, and the sixth electrical conductor 339 is formed from material(s) used to form low-resistance electrical contacts in silicon. In some embodiments, each of the first electrical conductor 329, the second electrical conductor 331, the third electrical conductor 333, the fourth electrical conductor 335, the fifth electrical conductor 337, and the sixth electrical conductor 339 is formed substantially outside of the optical waveguide 300. In some embodiments, each of the first electrical conductor 329, the second electrical conductor 331, the third electrical conductor 333, the fourth electrical conductor 335, the fifth electrical conductor 337, and the sixth electrical conductor 339 is formed to substantially overlap each of the doped regions to which it is electrically connected. In some embodiments, the first electrical conductor 329, the third electrical conductor 333, and the fifth electrical conductor 337 are replaced by a layer of silicide that extends continuously over the N-doped region 313, the P-doped region 317, the N-doped region 321, and the P-doped region 325. Similarly, in some embodiments, the second electrical conductor 331, the fourth electrical conductor 335, and the sixth electrical conductor 339 are replaced by a layer of silicide that extends continuously over the P-doped region 315, the N-doped region 319, the P-doped region 323, and the N-doped region 327.

Figure 4D:
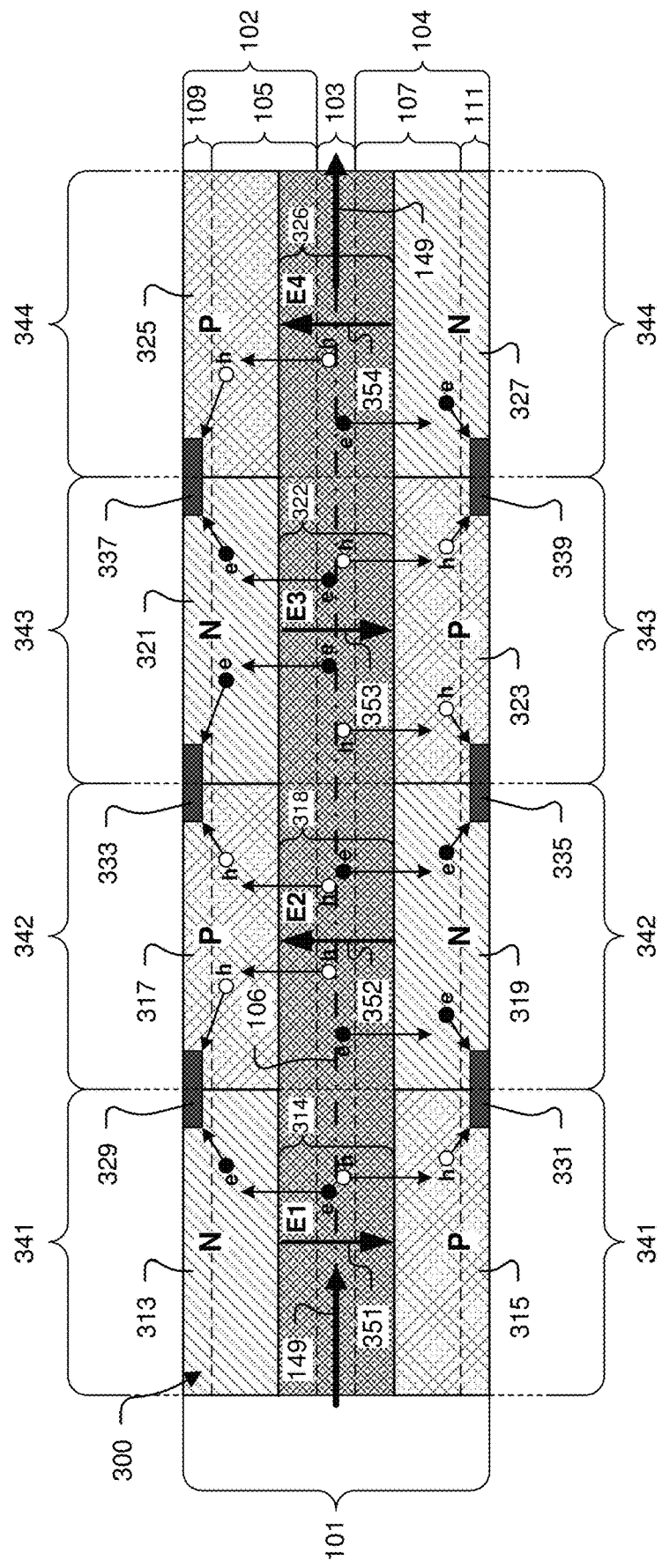
FIG. 4D shows the top view of the optical waveguide of FIG. 4A with depiction of how free-carriers (electrons (e) and holes (h)) are pulled/swept out of the core region by the diodes of the first diode segment, the second diode segment, the third diode segment, and the fourth diode segment, in accordance with some embodiments.

FIG. 4D shows the top view of the optical waveguide 300 of FIG. 4A with depiction of how free-carriers (electrons (e) and holes (h)) are pulled/swept out of the core region 103 by the diodes of the first diode segment 341, the second diode segment 342, the third diode segment 343, and the fourth diode segment 344, in accordance with some embodiments. The first intrinsic electric field E1 in the first diode segment 341 pulls the free-carrier electrons (e) out of the core region 103 to the N-doped region 313, and pulls the free-carrier holes (h) out of the core region 103 to the P-doped region 315. The second intrinsic electric field E2 in the second diode segment 342 pulls the free-carrier electrons (e) out of the core region 103 to the N-doped region 319, and pulls the free-carrier holes (h) out of the core region 103 to the P-doped region 317. The third intrinsic electric field E3 in the third diode segment 343 pulls the free-carrier electrons (e) out of the core region 103 to the N-doped region 321, and pulls the free-carrier holes (h) out of the core region 103 to the P-doped region 323. The fourth intrinsic electric field E4 in the fourth diode segment 344 pulls the free-carrier electrons (e) out of the core region 103 to the N-doped region 327, and pulls the free-carrier holes (h) out of the core region 103 to the P-doped region 325. The first electrical conductor 329 and the second electrical conductor 331 facilitate completion of an electrical circuit between the first diode segment 341 and the second diode segment 342. The second electrical conductor 333 and the third electrical conductor 335 facilitate completion of an electrical circuit between the second diode segment 342 and the third diode segment 343. The fifth electrical conductor 337 and the sixth electrical conductor 339 facilitate completion of an electrical circuit between the third diode segment 343 and the fourth diode segment 344.

The intrinsic electric fields E1-E4 across the optical waveguide 300 sweep out free-carriers that are generated within the core region 103 by TPA. By removing these free-carriers from the core region 103, the free-carrier concentration in the core region 103 stays low, which minimizes optical losses within the core region 103 due to free-carrier absorption. The orientations (perpendicular to the lengthwise centerline 106 of the optical waveguide 300) of the first, second, third, and fourth diode segments 341, 342, 343, 344, respectively, are alternated so as to close the electrical current loops created by the free-carrier sweep-out from the core region 103. It should be understood that without alternating the orientations of neighboring ones of the first, second, third, and fourth diode segments 341, 342, 343, 344, respectively, the electrical current generated by the sweep-out of TPA-generated free-carriers from the core region 103 would create an electrical charge build-up at the sides of the optical waveguide 300 that would counteract the built-in voltages of the first, second, third, and fourth diode segments 341, 342, 343, 344, respectively, and correspondingly shutdown/prevent free-carrier sweep-out from the core region 103. Therefore, by alternating the orientations of the first, second, third, and fourth diode segments 341, 342, 343, 344, respectively, along the length of the optical waveguide 300, the electrical current generated by free-carrier sweep-out in a given one of the diode segments 341, 342, 343, 344 is balanced by the electrical current generated in neighboring diode segments.

For example, in the example of FIG. 4D, the electrical current generated by free-carrier sweep-out in the first diode segment 341 is balanced by the electrical current generated by free-carrier sweep-out in the second diode segment 342. The first electrical conductor 329 and the second electrical conductor 331 facilitate balancing of electrical currents between the first diode segment 341 and the second diode segment 342. Also, the electrical current generated by free-carrier sweep-out in the second diode segment 342 is balanced by the electrical current generated by free-carrier sweep-out in the first diode segment 341 and the third diode segment 343. The third electrical conductor 333 and the fourth electrical conductor 335 facilitate balancing of electrical currents between the second diode segment 342 and the third diode segment 343. Also, the electrical current generated by free-carrier sweep-out in the third diode segment 343 is balanced by the electrical current generated by free-carrier sweep-out in the second diode segment 342 and the fourth diode segment 344. The fifth electrical conductor 337 and the sixth electrical conductor 339 facilitate balancing of electrical currents between the third diode segment 343 and the fourth diode segment 344. Also, the electrical current generated by free-carrier sweep-out in the fourth diode segment 344 is balanced by the electrical current generated by free-carrier sweep-out in the third diode segment 343.

The alternating orientations of the first, second, third, and fourth diode segments 341, 342, 343, 344, respectively, along the length of the optical waveguide 300 avoids the need for having additional electrical interconnection structures around the optical waveguide 300. In the optical waveguide 300, the electrical field used to sweep out free-carriers from the core region 103 is the intrinsic (built-in) electrical field of the PN diode junctions within each of the first, second, third, and fourth diode segments 341, 342, 343, 344, respectively. In some embodiments, because the electrical current generated by TPA within the core region 103 results in a voltage drop across the optical waveguide 300, which would tend to counter the free-carrier sweep-out effect, the respective lengths of the diode segments 341, 342, 343, 344, etc. along the optical waveguide 300 are made smaller to enhance the electrical current balancing between neighboring ones of the diode segments 341, 342, 343, 344, etc. having opposite orientations across the optical waveguide 300. Also, in some embodiments, some of the different diode segments 341, 342, 343, 344, etc. along the optical waveguide 300 have different lengths, as measured parallel to the lengthwise centerline 106 of the optical waveguide 300. In some embodiments, the different lengths of the different diode segments 341, 342, 343, 344, etc. along the optical waveguide 300 are defined to compensate for an electrical current density imbalance between the different diode segments 341, 342, 343, 344, etc.

In some embodiments, optical decay along the optical waveguide 300 will affect the TPA electrical current generation and create an electrical current imbalance which will result in a small voltage drop across the optical waveguide 300 between the first cladding region 102 and the second cladding region 104. In some embodiments, the lengths of the different diode segments 341, 342, 343, 344, etc. along the optical waveguide 300 are defined to compensate for the electrical current density differences (imbalances) along the optical waveguide 300 caused by the optical decay effect on TPA electrical current generation. Therefore, in some embodiments, the lengths of the different diode segments 341, 342, 343, 344, etc. along the optical waveguide 300 are defined to improve electrical current balance along the length of the optical waveguide 300, which provides for reduction in voltage build-up between the first cladding region 102 and the second cladding region 104 along the length of the optical waveguide 300.

It should be understood that, in some embodiments, the optical waveguide 300 provides a silicon optical waveguide structure having reduced TPA-driven optical power loss at high optical power. As described with regard to FIGS. 4A-4D, in some embodiments, the optical waveguide 300 is a rib-shaped optical waveguide structure that is doped on each side to create multiple diode structures of alternating orientation along the length of the optical waveguide 300. Also, it should be understood that, in some embodiments, the optical waveguide 300 is constructed with minimal to no additional electrical interconnection structures near or on the optical waveguide 300, which is beneficial at least because such additional electrical interconnection structures could potentially optically interfere with light traveling through the optical waveguide 300. In particular, in some embodiments, the optical waveguide 300 does not require routing of metal traces over the core region 103 in order to short the diode terminals of the diode segments 341, 342, 343, 344, etc. along the length of the optical waveguide 300. In some embodiments, each of the diode segments 341, 342, 343, 344, etc. of the optical waveguide 300 is not connected to any electrical circuit external to the optical waveguide 300.

Figure 5A:
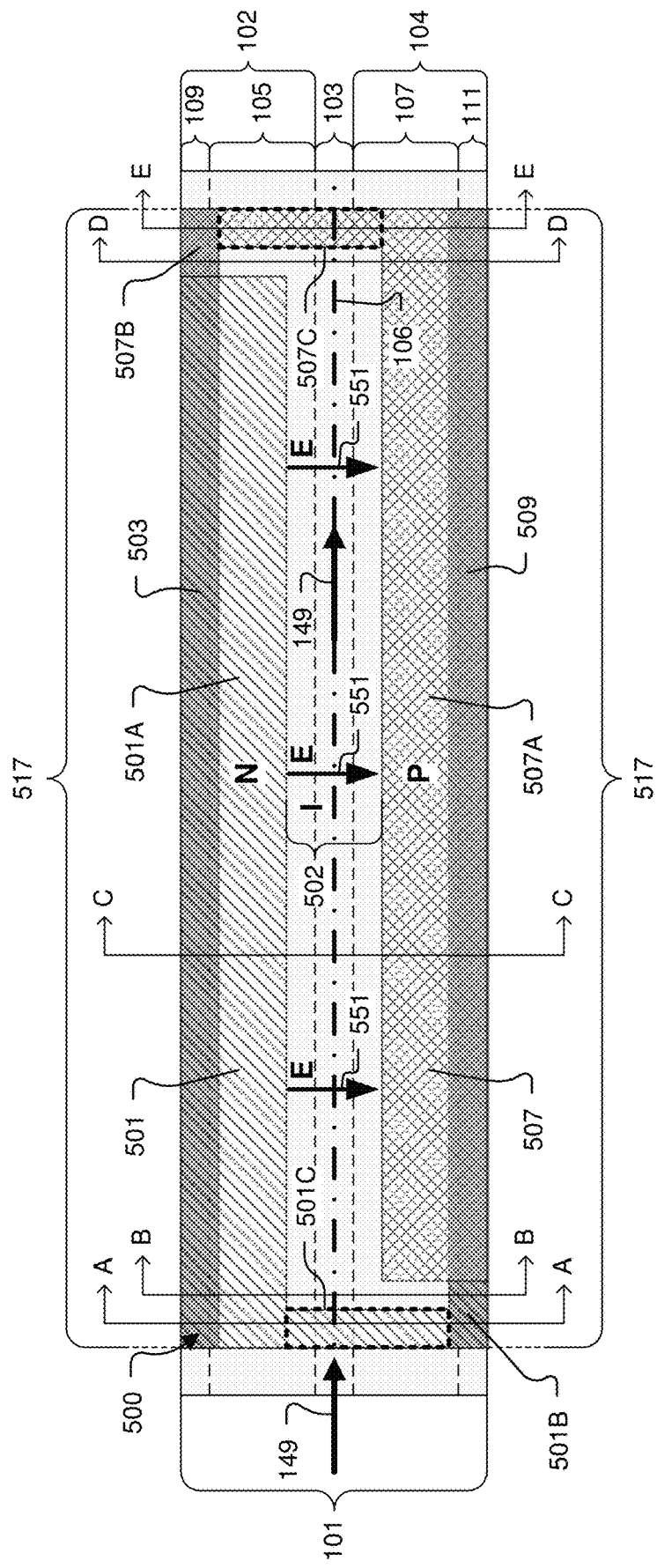
FIG. 5A shows a top view of an optical waveguide, in accordance with some embodiments.
Figure 5B:
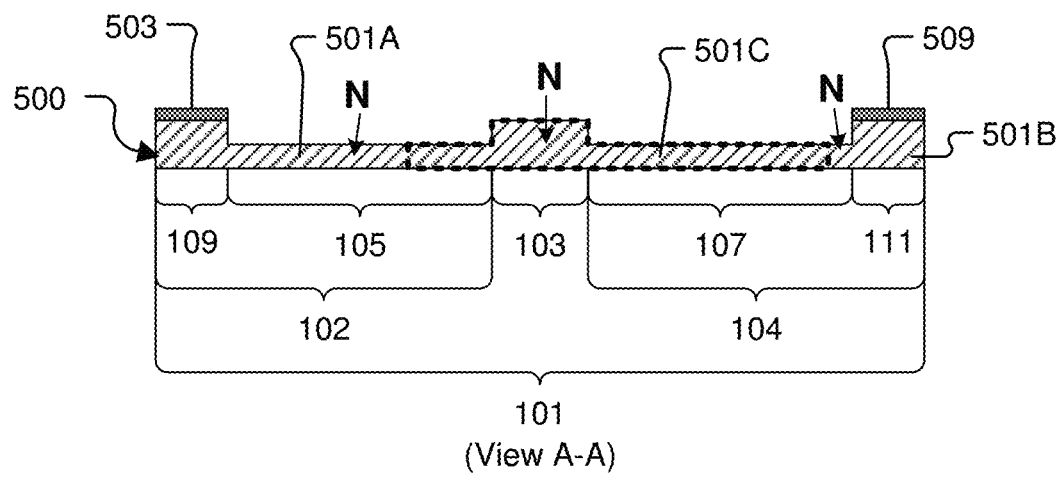
FIG. 5B shows a vertical cross-section view through the optical waveguide, referenced as View A-A in FIG. 5A, in accordance with some embodiments.
Figure 5C:
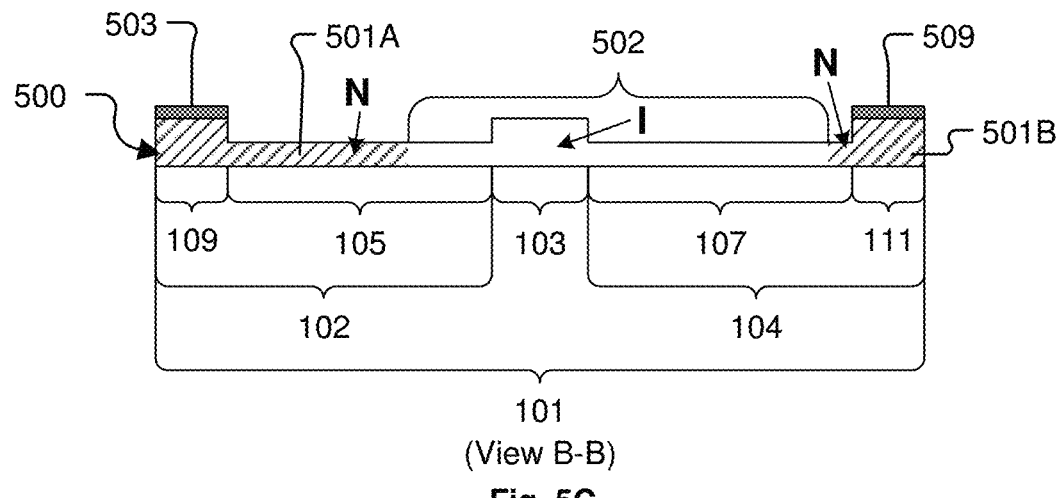
FIG. 5C shows a vertical cross-section view through the optical waveguide, referenced as View B-B in FIG. 5A, in accordance with some embodiments.
Figure 5D:
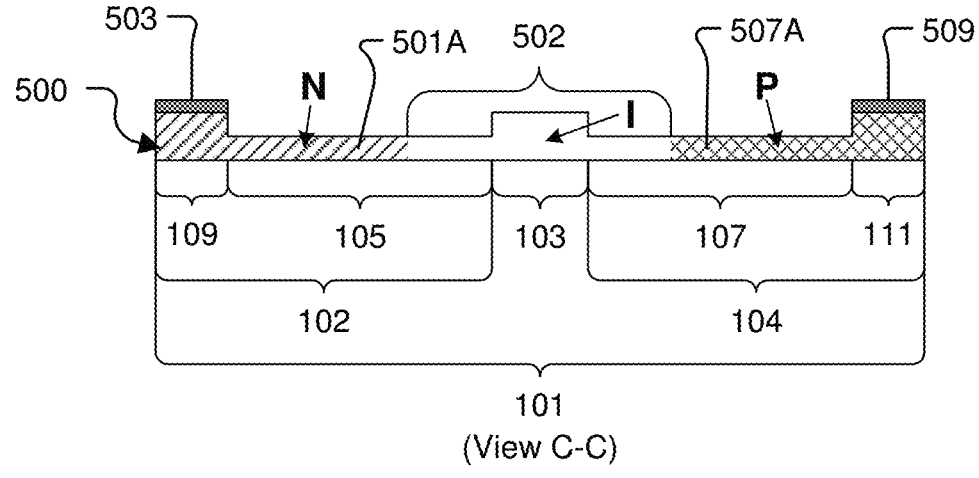
FIG. 5D shows a vertical cross-section view through the optical waveguide, referenced as View C-C in FIG. 5A, in accordance with some embodiments.
Figure 5E:
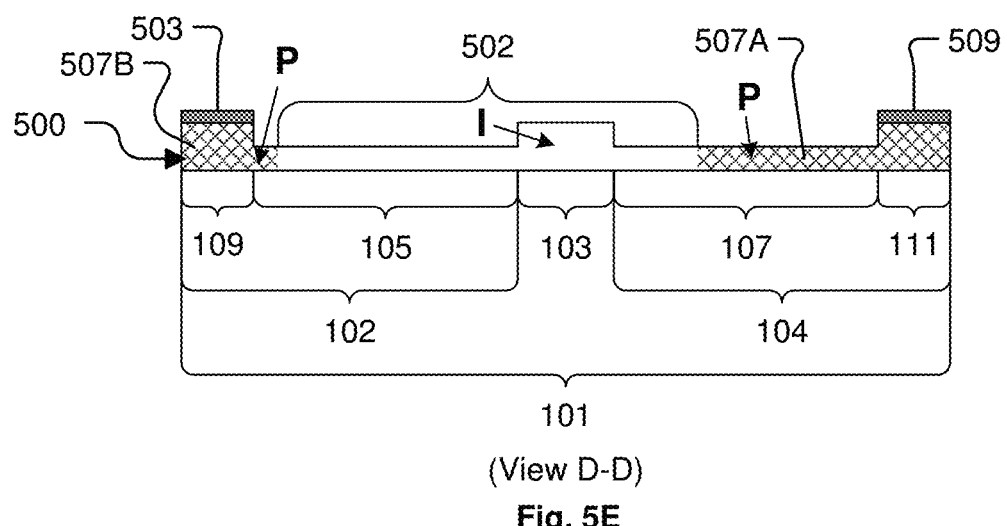
FIG. 5E shows a vertical cross-section view through the optical waveguide, referenced as View D-D in FIG. 5A, in accordance with some embodiments.
Figure 5F:
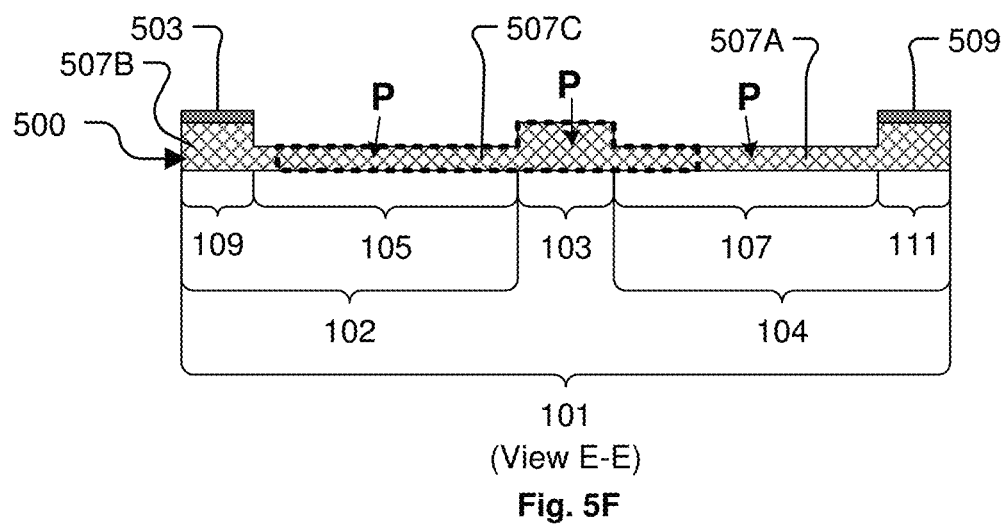
FIG. 5F shows a vertical cross-section view through the optical waveguide, referenced as View E-E in FIG. 5A, in accordance with some embodiments.

FIG. 5A shows a top view of an optical waveguide 500, in accordance with some embodiments. FIG. 5B shows a vertical cross-section view through the optical waveguide 500, referenced as View A-A in FIG. 5A, in accordance with some embodiments. FIG. 5C shows a vertical cross-section view through the optical waveguide 500, referenced as View B-B in FIG. 5A, in accordance with some embodiments. FIG. 5D shows a vertical cross-section view through the optical waveguide 500, referenced as View C-C in FIG. 5A, in accordance with some embodiments. FIG. 5E shows a vertical cross-section view through the optical waveguide 500, referenced as View D-D in FIG. 5A, in accordance with some embodiments. FIG. 5F shows a vertical cross-section view through the optical waveguide 500, referenced as View E-E in FIG. 5A, in accordance with some embodiments.

The optical waveguide 500 is a modification of the optical waveguide 100 of FIGS. 1A-1B. The optical waveguide 500 includes the core region 103, the first cladding region 102, and the second cladding region 104 as described with regard to FIGS. 1A-1B. The first cladding region 102 is formed along a first side of the core region 103. The second cladding region 104 is formed along a second side of the core region 103. The optical waveguide 500 includes a diode segment 517 that includes a portion of the core region 103, a portion of the first cladding region 102, and a portion of the second cladding region 104. It should be understood that for ease of description FIG. 5A depicts a portion of the optical waveguide 500. In some embodiments, multiple instances of the diode segment 517 are formed along the length of the optical waveguide 500.

The optical waveguide 500 includes an N-doped region 501, a P-doped region 507, and an intrinsic region 502 located between the N-doped region 501 and the P-doped region 507. The N-doped region 501 includes a first lengthwise section formed 501A within the first cladding region 102, a second lengthwise section 501B formed within the second cladding region 104, and a crosswise section 501C formed to extend between the first lengthwise section 501A and the second lengthwise section 501B of the N-doped region 501. The P-doped region 507 includes a first lengthwise section 507A formed within the second cladding region 104, a second lengthwise section 507B formed within the first cladding region 102, and a crosswise section 507C formed to extend between the first lengthwise section 507A and the second lengthwise section 507B of the P-doped region 507. A first electrical conductor 503 is disposed to electrically connect the first lengthwise section 501A of the N-doped region 501 and the second lengthwise section 507B of the P-doped region 507 at a location above the first cladding region 102. A second electrical conductor 509 is disposed to electrically connect the first lengthwise section 507A of the P-doped region 507 and the second lengthwise section 501B of the N-doped region 501 at a location above the second cladding region 104. The first lengthwise section 501A of the N-doped region 501, the first lengthwise section 507A of the P-doped region 507, and the intrinsic region 502 collectively form a PIN diode across the optical waveguide 500.

The first electrical conductor 503 and the second electrical conductor 509 collectively close an electrical circuit between the N-doped region 501 and the P-doped region 507. In some embodiments, the first electrical conductor 503 is formed as a region of silicide, and the second electrical conductor 509 is formed as another region of silicide. In some embodiments, the first electrical conductor 503 is formed as an electrically conductive structure disposed on an outer portion of the first cladding region 102, and the second electrical conductor 509 is formed as an electrically conductive structure disposed on an outer portion of the second cladding region 104. The diode segment 517 is configured to form a diode across the optical waveguide 500 such that an intrinsic electric field E extends across the diode segment 517 from the N-doped region 501 to the P-doped region 507 in a direction 551 substantially perpendicular to the lengthwise centerline 106 of the optical waveguide 500. The built-in voltage of the diode segment 517 provided by the N-doped region 501 and the P-doped region 507 establishes the intrinsic electric field E across the diode segment 517, and particularly across the core region 103 within the diode segment 517. In some embodiments, the intrinsic region 502 includes an entirety of the core region 103 within the diode segment 517, a portion of the first cladding region 102 within the diode segment 517, and a portion of the second cladding region 104 within the diode segment 517. It should be understood that the core region 103 is present in the intrinsic region 502 where the intrinsic electric field E is high. The width of the intrinsic region 502 is created wide enough so as to avoid overlap of the N-doped region 501 and the P-doped region 507 within the optical waveguide 500.

Figure 5G:
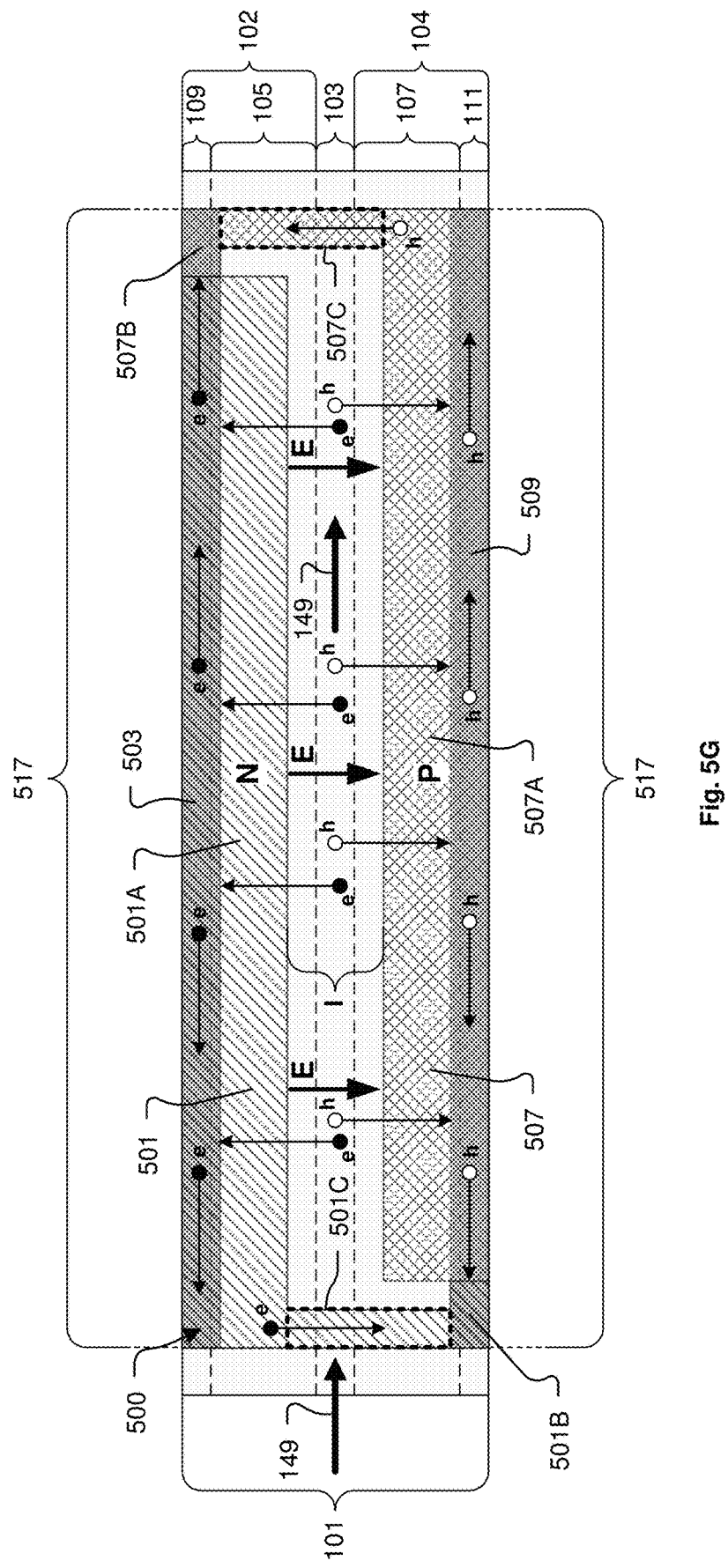
FIG. 5G shows the top view of the optical waveguide of FIG. 5A with depiction of how free-carriers (electrons (e) and holes (h)) are pulled/swept out of the core region by the diode segment, in accordance with some embodiments.

FIG. 5G shows the top view of the optical waveguide 500 of FIG. 5A with depiction of how free-carriers (electrons (e) and holes (h)) are pulled/swept out of the core region 103 by the diode segment 517, in accordance with some embodiments. The intrinsic electric field E in the diode segment 517 pulls the free-carrier electrons (e) out of the core region 103 to the N-doped region 501, and pulls the free-carrier holes (h) out of the core region 103 to the P-doped region 507. The intrinsic electric field E across the optical waveguide 500 sweeps out free-carriers that are generated within the core region 103 by TPA. By removing these free-carriers from the core region 103, the free-carrier concentration in the core region 103 stays low, which minimizes optical losses within the core region 103 due to free-carrier absorption. The first electrical conductor 503 and the second electrical conductor 509 facilitate completion of an electrical current loop within the diode segment 517, so that the electrical current generated by the sweep-out of TPA-generated free-carriers from the core region 103 does not create an electrical charge build-up at the sides of the optical waveguide 500 that would counteract the built-in voltage of the diode segment 517, and correspondingly shutdown/prevent free-carrier sweep-out from the core region 103.

Also, it should be understood that the electrical current loop within the diode segment 517 is closed using the crosswise section 501C of the N-doped region 501 and the crosswise section 507C of the P-doped region 507. In some embodiments, each of the crosswise section 501C and the crosswise section 507C is formed as a thin-doped region conductive channel that crosses the core region 103 of the optical waveguide 500. In some embodiments, such as shown in FIGS. 5A-5G, the crosswise section 501C and the crosswise section 507C are placed on opposite sides of the diode segment 517. In various embodiments, as an alternative to having the crosswise sections 501C and 507C, one or more thin doped region conductive channel(s) like the crosswise sections 501, 507C can be placed at different positions along the waveguide structure 500, where the thin doped region conductive channel(s) is/are P-doped or N-doped. In some embodiments, as an alternative to having both the crosswise section 501C and the crosswise section 507C, a thin doped region conductive channel is positioned on one side of the diode segment 517. In some embodiments, as an alternative to having the crosswise sections 501C and 507C, a thin doped region conductive channel is positioned substantially in the center of the diode segment 517. Also, in some embodiments, thin doped region conductive channels are periodically positioned along the diode segment 517.

It should be understood that, in some embodiments, the optical waveguide 500 provides a silicon optical waveguide structure having reduced TPA-driven optical power loss at high optical power. It should be understood that, in some embodiments, the optical waveguide 500 is constructed with minimal to no additional electrical interconnection structures near or on the optical waveguide 500, which is beneficial at least because such additional electrical interconnection structures could potentially optically interfere with light traveling through the optical waveguide 500. In particular, in some embodiments, the optical waveguide 500 does not require routing of metal traces over the core region 103 in order to short the diode terminals of the diode segment 517. In some embodiments, the diode segment 517 of the optical waveguide 500 is not connected to any electrical circuit external to the optical waveguide 500.

FIG. 6 shows a flowchart of a method for reducing optical loss within an optical waveguide (200, 300), in accordance with some embodiments. The method includes an operation 601 for having an optical waveguide (200, 300) that includes a core region (103), a first cladding region (102), and a second cladding region (104). The core region 103 extends substantially along a lengthwise centerline (106) of the optical waveguide (200, 300) that corresponds to a light propagation direction (149) through the optical waveguide (200, 300). The first cladding region (102) is formed along a first side of the core region (103). The second cladding region (104) is formed along a second side of the core region (103). The optical waveguide (200, 300) includes a first diode segment (241, 341) and a second diode segment (242, 342) that each includes respective portions of the core region (103), the first cladding region (102), and the second cladding region (104). The second diode segment (242, 342) is contiguous with the first diode segment (241, 341). The first diode segment (241, 341) is configured to form a first diode across the optical waveguide (200, 300), such that a first intrinsic electric field (E1) extends across the first diode segment (241, 341) in a first direction substantially perpendicular to the lengthwise centerline (106) of the optical waveguide (200, 300). The second diode segment (242, 342) is configured to form a second diode across the optical waveguide (200, 300), such that a second intrinsic electric field (E2) extends across the second diode segment (242, 342) in a second direction opposite the first direction. The optical waveguide (200, 300) includes a first electrical conductor (229, 329) disposed to electrically connect the first diode segment (241, 341) and the second diode segment (242, 342) at a location on the first side of the core region (103). The optical waveguide (200, 300) includes a second electrical conductor (231, 331) disposed to electrically connect the first diode segment (241, 341) and the second diode segment (242, 342) at a location on the second side of the core region (103). The method also includes an operation 603 for transmitting light through the core region (103) of the optical waveguide (200, 300), such that some of the light generates free-carriers (electrons and holes) within the core region (103), where the generated free-carriers are swept out of the core region (103) within the first diode segment (241, 341) of the optical waveguide (200, 300) by the first intrinsic electric field (E1), and where the generated free-carriers are swept out of the core region (103) within the second diode segment (242, 342) of the optical waveguide (200, 300) by the second intrinsic electric field (E2). It should be understood that the method of FIG. 6 further includes any additional operations corresponding to operation and use of the optical waveguides 200 and 300 described herein.

Figure 7:
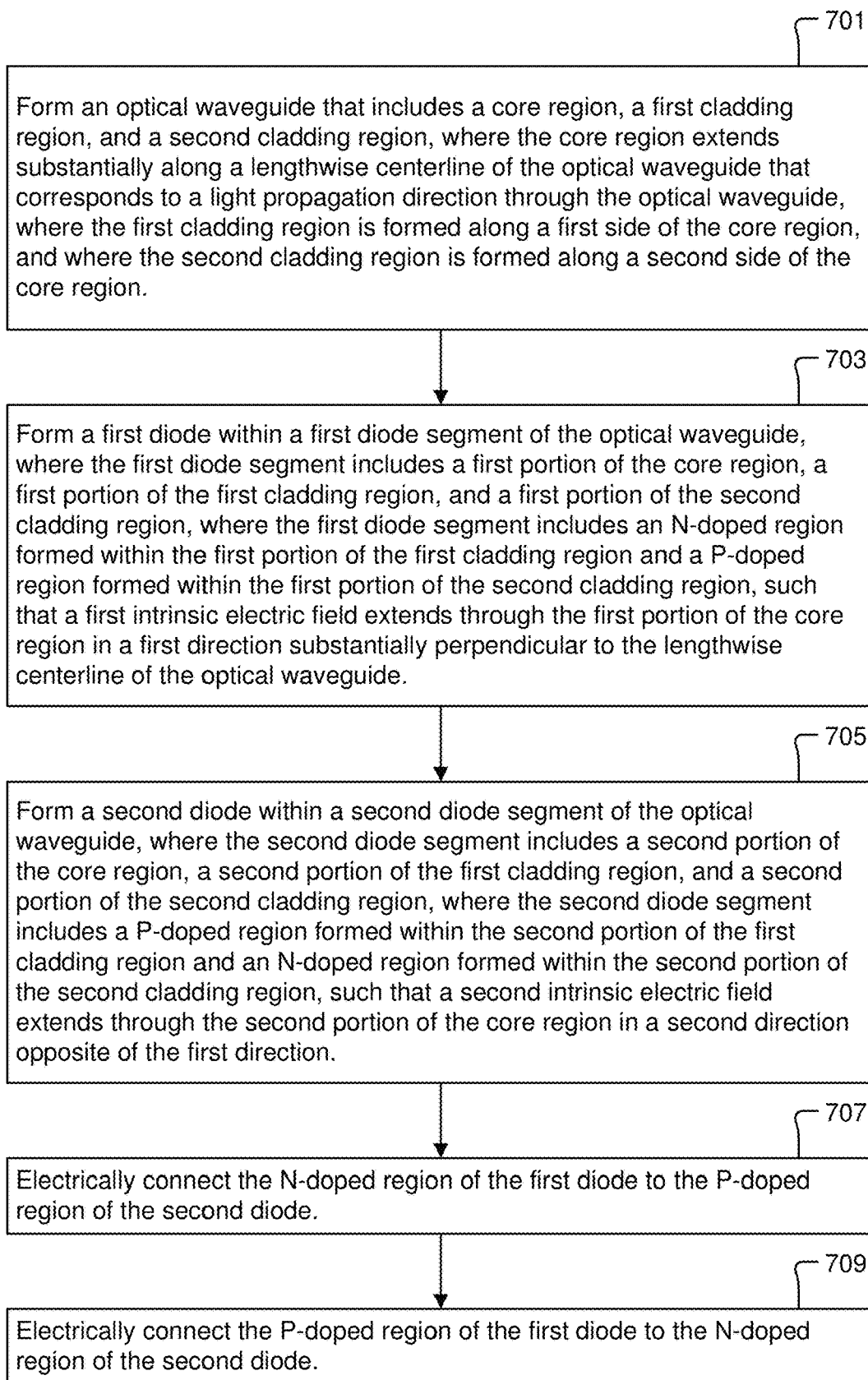
FIG. 7 shows a flowchart of a method for manufacturing an optical conveyance device, in accordance with some embodiments.

FIG. 7 shows a flowchart of a method for manufacturing an optical conveyance device, in accordance with some embodiments. The method includes an operation 701 for forming an optical waveguide (200, 300) that includes a core region (103), a first cladding region (102), and a second cladding region (104). The core region (103) extends substantially along a lengthwise centerline (106) of the optical waveguide (200, 300) that corresponds to a light propagation direction (149) through the optical waveguide (200, 300). The first cladding region (102) is formed along a first side of the core region (103). The second cladding region (104) is formed along a second side of the core region (103). The method also includes an operation 703 for forming a first diode within a first diode segment (241, 341) of the optical waveguide (200, 300). The first diode segment (241, 341) includes a first portion of the core region (103), a first portion of the first cladding region (102), and a first portion of the second cladding region (104). The first diode includes an N-doped region (213, 313) formed within the first portion of the first cladding region (102) and a P-doped region (215, 315) formed within the first portion of the second cladding region (104), such that a first intrinsic electric field (E1) extends through the first portion of the core region (103) in a first direction substantially perpendicular to the lengthwise centerline (106) of the optical waveguide (200, 300). The method also includes an operation 705 for forming a second diode within a second diode segment (242, 342) of the optical waveguide (200, 300). The second diode segment (242, 342) includes a second portion of the core region (103), a second portion of the first cladding region (102), and a second portion of the second cladding region (104). The second diode includes a P-doped region (217, 317) formed within the second portion of the first cladding region (102) and an N-doped region (219, 319) formed within the second portion of the second cladding region (104), such that a second intrinsic electric field (E2) extends through the second portion of the core region (103) in a second direction opposite of the first direction. The method also includes an operation 707 for electrically connecting the N-doped region (213, 313) of the first diode to the P-doped region (217, 317) of the second diode. The method also includes an operation 709 for electrically connecting the P-doped region (215, 315) of the first diode to the N-doped region (219, 319) of the second diode. It should be understood that the method of FIG. 7 further includes any additional operations corresponding to manufacturing of the optical waveguides 200 and 300 described herein.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. An optical conveyance device, comprising:
   an optical waveguide;
   a first diode formed across the optical waveguide, the first diode including a first doped region of a first dopant type along a first side of the optical waveguide and a second doped region of a second dopant type along a second side of the optical waveguide, the first diode establishing a first intrinsic electric field across the optical waveguide in a first direction;
   a second diode formed across the optical waveguide, the second diode including a first doped region of the second dopant type along the first side of the optical waveguide and a second doped region of the first dopant type along the second side of the optical waveguide, the second diode establishing a second intrinsic electric field across the optical waveguide in a second direction that is opposite the first direction;
   a first electrical conductor connected to both the first doped region of the first diode and the first doped region of the second diode; and
   a second electrical conductor connected to both the second doped region of the first diode and the second doped region of the second diode.

2. The optical conveyance device as recited in claim 1, wherein the first electrical conductor is disposed to connect the first diode to the second diode at the first side of the optical waveguide, and
   wherein the second electrical conductor is disposed to connect the first diode to the second diode at the second side of the optical waveguide.

3. The optical conveyance device as recited in claim 1, wherein the first doped region of the first diode is N-doped, and the first doped region of the second diode is P-doped, and wherein the second doped region of the first diode is P-doped, and the second doped region of the second diode is N-doped.

4. The optical conveyance device as recited in claim 3, wherein the first doped region of the first diode and the second doped region of the first diode are collectively configured to form the first intrinsic electric field across the optical waveguide in the first direction, and wherein the first doped region of the second diode and the second doped region of the second diode are collectively configured to form the second intrinsic electric field across the optical waveguide in the second direction.

5. The optical conveyance device as recited in claim 3, wherein the first doped region of the first diode and the first doped region of the second diode share a first common boundary, and wherein the second doped region of the first diode and the second doped region of the second diode share a second common boundary.

6. The optical conveyance device as recited in claim 3, wherein the first electrical conductor extends continuously along an entire length of both the first diode and the second diode as measured in a light propagation direction through the optical waveguide; and
   wherein the second electrical conductor extends continuously along an entire length of both the first diode and the second diode as measured in the light propagation direction through the optical waveguide.

7. The optical conveyance device as recited in claim 3, wherein both the first doped region of the first diode and the first doped region of the second diode are formed within a first cladding region of the optical waveguide, and wherein both the second doped region of the first diode and the second doped region of the second diode are formed within a second cladding region of the optical waveguide.

8. The optical conveyance device as recited in claim 7, wherein the first cladding region includes a first inner cladding region having a first vertical thickness and a first outer cladding region having a second vertical thickness greater than the first vertical thickness, and wherein the second cladding region includes a second inner cladding region having the first vertical thickness and a second outer cladding region having the second vertical thickness.

9. The optical conveyance device as recited in claim 8, wherein the first electrical conductor is disposed on the first outer cladding region, and wherein the second electrical conductor is disposed on the second outer cladding region.

10. The optical conveyance device as recited in claim 9, wherein each of the first doped region of the first diode and the first doped region of the second diode is formed within the first outer cladding region, and wherein each of the second doped region of the first diode and the second doped region of the second diode is formed within the second outer cladding region.

11. The optical conveyance device as recited in claim 10, wherein each of the first doped region of the first diode and the first doped region of the second diode is partially formed within a portion of the first inner cladding region, and wherein each of the second doped region of the first diode and the second doped region of the second diode is partially formed within the second inner cladding region.

12. The optical conveyance device as recited in claim 10, wherein the optical waveguide includes a core region located between the first inner cladding region of the optical waveguide and the second inner cladding region of the optical waveguide.

13. The optical conveyance device as recited in claim 12, wherein the core region of the optical waveguide has a third vertical thickness greater than the first vertical thickness.

14. The optical conveyance device as recited in claim 13, wherein the third vertical thickness is substantially equal to the second vertical thickness.

15. The optical conveyance device as recited in claim 1, wherein the first diode and the second diode are formed adjacent to each other along a length of the optical waveguide as measured in a light propagation direction through the optical waveguide.

16. The optical conveyance device as recited in claim 15, wherein the first diode is one of a plurality of instances of the first diode formed along the length of the optical waveguide, and wherein the second diode is one of a plurality of instances of the second diode formed along the length of the optical waveguide, and wherein plurality of instances of the first diode and the plurality of instances of the second diode are formed in an alternating manner along the length of the optical waveguide.

17. The optical conveyance device as recited in claim 16, wherein a length of each of the plurality of instances of the first diode as measured in the light propagation direction along the optical waveguide is substantially equal to a length of each of the plurality of instances of the second diode as measured in the light propagation direction along the optical waveguide.

18. The optical conveyance device as recited in claim 16, wherein each of the plurality of instances of the first diode has a respective length as measured in the light propagation direction along the optical waveguide, and wherein each of the plurality of instances of the second diode has a respective length as measured in the light propagation direction along the optical waveguide, and wherein the respective lengths of the plurality of instances of the first diode and the respective lengths of the plurality of instances of the second diode are configured to compensate for two-photon-absorption-induced electrical current density differences along the optical waveguide.

19. The optical conveyance device as recited in claim 1, wherein the optical waveguide includes a curved portion, and wherein the first diode and the second diode are formed within the curved portion of the optical waveguide.

\* \* \* \* \*